US007774811B2

(12) United States Patent
Poslinski et al.

(10) Patent No.: US 7,774,811 B2
(45) Date of Patent: Aug. 10, 2010

(54) METHOD AND SYSTEM FOR USE IN DISPLAYING MULTIMEDIA CONTENT AND STATUS

(75) Inventors: Thomas Poslinski, Elma, NY (US); Hong Yang, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1377 days.

(21) Appl. No.: 10/928,552

(22) Filed: Aug. 26, 2004

(65) Prior Publication Data

US 2006/0048184 A1    Mar. 2, 2006

(51) Int. Cl.
*H04N 7/10* (2006.01)
*H04N 7/025* (2006.01)
*H04N 5/445* (2006.01)
*G06F 3/00* (2006.01)
*G06F 13/00* (2006.01)

(52) U.S. Cl. .............................. 725/45; 725/34; 725/46
(58) Field of Classification Search ................... 725/34, 725/37–61; 704/9
See application file for complete search history.

(56) References Cited

U.S. PATENT DOCUMENTS

| 5,532,754 | A | * | 7/1996 | Young et al. ................... 725/47 |
| 5,583,576 | A | | 12/1996 | Perlman et al. |
| 5,621,456 | A | * | 4/1997 | Florin et al. ................... 725/43 |
| 5,699,125 | A | | 12/1997 | Rzeszewski et al. |
| 6,118,492 | A | * | 9/2000 | Milnes et al. ................ 725/52 |
| 6,172,674 | B1 | | 1/2001 | Etheredge |
| 6,639,687 | B1 | | 10/2003 | Neilsen |
| 6,701,523 | B1 | | 3/2004 | Hancock et al. |
| 6,732,367 | B1 | * | 5/2004 | Ellis et al. ..................... 725/27 |
| 6,756,997 | B1 | | 6/2004 | Ward, III et al. |
| 6,785,901 | B1 | * | 8/2004 | Horiwitz et al. ............... 725/25 |
| 6,847,778 | B1 | * | 1/2005 | Vallone et al. ................ 386/68 |

(Continued)

OTHER PUBLICATIONS

Guglielmo and Rowe, "Overview of Natural Language Processing of Captions for Retrieving Multimedia Data," Applied Natural Language Conferences, 1992, pp. 231-232, Association for Computational Linguistics, Morristown, NJ, USA.*

(Continued)

*Primary Examiner*—Scott Beliveau
*Assistant Examiner*—Alexander Q Huerta
(74) *Attorney, Agent, or Firm*—Fitch, Even, Tabin & Flannery

(57) ABSTRACT

The present embodiments provide methods, apparatuses, and systems for use in controlling the display of information relative to the playback of programming content and displaying programming guide data. Some embodiments provide a method for use in controlling the display of an electronic programming guide. The method receives programming guide data, determines whether the guide data is to be filtered, filters the guide data to replace at least a first title with a generic title, determines whether limits are to be applied to the guide data, applies the limits to the programming guide data by replacing at least a second title with the generic title, and displays a programming guide according to programming guide data as filtered and as limited. Some embodiments further display progress bars for one or more active applications. Trick commands can be implemented by applications by selecting one or more of the displayed progress bars.

20 Claims, 18 Drawing Sheets

U.S. PATENT DOCUMENTS

| | | |
|---|---|---|
| 7,200,854 B2 * | 4/2007 | Moir .................. 725/40 |
| 2001/0033343 A1 | 10/2001 | Yap et al. |
| 2001/0055017 A1 | 12/2001 | Ording |
| 2002/0013851 A1 | 1/2002 | Crandall |
| 2002/0054750 A1 | 5/2002 | Ficco et al. |
| 2002/0174430 A1 * | 11/2002 | Ellis et al. ............ 725/46 |
| 2002/0180795 A1 | 12/2002 | Wright |
| 2003/0009495 A1 * | 1/2003 | Adjaoute .............. 707/501.1 |
| 2003/0070168 A1 | 4/2003 | Stone |
| 2003/0088873 A1 * | 5/2003 | McCoy et al. ......... 725/63 |
| 2003/0095792 A1 | 5/2003 | Ogikubo |
| 2003/0110514 A1 * | 6/2003 | West et al. ............ 725/134 |
| 2003/0115592 A1 | 6/2003 | Johnson |
| 2003/0149981 A1 | 8/2003 | Finster et al. |
| 2003/0154477 A1 * | 8/2003 | Hassell et al. ......... 725/39 |
| 2003/0163811 A1 | 8/2003 | Luehrs |
| 2004/0123135 A1 | 6/2004 | Goddard |
| 2005/0044570 A1 * | 2/2005 | Poslinski ............ 725/48 |
| 2005/0076367 A1 * | 4/2005 | Johnson et al. ........ 725/58 |
| 2005/0166230 A1 * | 7/2005 | Gaydou et al. ......... 725/41 |
| 2007/0226766 A1 * | 9/2007 | Poslinski et al. ....... 725/89 |
| 2008/0320523 A1 * | 12/2008 | Morris et al. .......... 725/47 |
| 2009/0235198 A1 * | 9/2009 | Migos et al. .......... 715/780 |

OTHER PUBLICATIONS

Guglielmo and Rowe, "Overview of Natural Language Processing of Captions for Retrieving Multimedia Data," Applied Natural Language Conferences, 1992, pp. 231-232, Association for Computational Linguistics, Morristown, NJ, USA.

* cited by examiner

FIG. 17

| 100 | Title 1 | Title 2 | Title 3 | Title 4 | Title 5 | Title 6 | T |
| 101 | Gang Fights on the Street | | Title 8 | | | | |
| 102 | Title 9 (PG) | Title 10 (PG-13) | | | Title 11 (R) | | |
| 103 | Title 12 (G) | | | | | | T |
| 104 | Title 13 | Title 14 | Title 15 | Sex In The City | Title 17 | | |
| 108 | Nature's Fight For Life | | | Title 19 | Title 20 | T | |
| 110 | | | | | | | |
| 190 | | | | | | 5 (R) | |

USER: First

Times: 8:00 8:30 9:00 9:30 10:00 10:30 11:00 11:30

Nature's Fight For Life   Time: 1hr.   Rating: G
... because male sex is often brightly colored ......

FIG. 18

| 100 | Title 1 | Title 2 | Title 3 | Title 4 | Title 5 | Title 6 | T |
| 101 | Restricted | | Title 8 | | | | |
| 102 | Title 9 (PG) | Title 10 (PG-13) | | | Title 11 (R) | | |
| 103 | Title 12 (G) | | | | | | T |
| 104 | Title 13 | Title 14 | Title 15 | Restricted | Title 17 | | |
| 108 | Nature's Fight For Life | | | Title 19 | Title 20 | T | |
| 110 | | | | | | | |
| 190 | | | | | | 5 (R) | |

USER: First

Nature's Fight For Life   Time: 1hr.   Rating: G
... because male sex is often brightly colored ......

METHOD AND SYSTEM FOR USE IN DISPLAYING MULTIMEDIA CONTENT AND STATUS

FIELD OF THE INVENTION

The present invention relates generally to multimedia content, and more particularly to displaying information about the multimedia content.

BACKGROUND

The amount of multimedia content, such as television programming, movies and other such multimedia content, delivered directly to viewers at home has increased dramatically. Additionally, the types of content and the types of programming available to viewers have similarly increased.

Viewers are watching more programming and thus being exposed to a greater spectrum of content. To aid viewers in identifying those programs that a viewer might be interested in seeing, many program providers and/or broadcasters additionally supply programming guide data that allow some televisions and/or cooperating systems to display a guide that lists available channels and the programming that can be seen on each channel.

Viewers of substantially all ages utilize these guides to help in identifying and/or locating programming of interest. The programming guide data includes, in some instances, a significant amount of data to the viewer. For example, some programming guides provide titles of programming content as well as description and/or summary data.

SUMMARY OF THE EMBODIMENT

The present embodiments advantageously address the needs above as well as other needs through the provision of the methods, apparatuses, and systems for use in controlling the display of information relative to the playback of programming content and displaying programming guide data. Some embodiments provide a method for use in controlling the display of an electronic programming guide. The method receives programming guide data, determines whether the programming guide data is to be filtered, filters the programming guide data when it is determined that the programming guide data is to be filtered comprising replacing at least a first title with a generic title, determines whether limits are to be applied to the programming guide data, applies the limits to the programming guide data when it is determined that the limits are to be applied to the programming guide data comprising replacing at least a second title with the generic title, and displays a programming guide according to programming guide data as filtered and as limited.

In some alternative embodiments, methods are provided for use in controlling the display of information relative to the playback of programming content. These methods receive programming content, initiate a main application to playback a main program from at least a portion of the programming content, display a main progress bar associated with the main application that is active, determine whether first additional applications are active in addition to the main application, display a first additional progress bar for each of the first additional applications that are active, determine whether at least two of the active applications are capable of implementing a first trick command, wherein the active applications comprise the main application and the first additional application, mark at least one progress bar associated with the at least two active application capable of receiving the first trick command so as to provide at least one first-marked progress bar, and execute the first trick command through the active application associated with the at least one first-marked progress bar.

Some further embodiments provide and apparatus for use in controlling the display programming information. The apparatus includes an input port for receiving programming content and programming guide data, means for natural language filtering that filters the programming guide data, means for generating programming guide using the programming guide data as filtered by the means for natural language filtering, means for playing back programming content, means for recording programming content, means for monitoring the progress of the means for playing back programming content and means for recording programming content, and means for generating a plurality of progress bars according to the means for monitoring the progress.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 17 depicts a simplified diagram of an electronic programming guide generated according to some embodiments prior to applying one or more filters;

FIG. 18 depicts a simplified diagram of the electronic programming guide similar to the programming guide of FIG. 17 generated after word and/or natural language filtering is applied;

Figure 1:
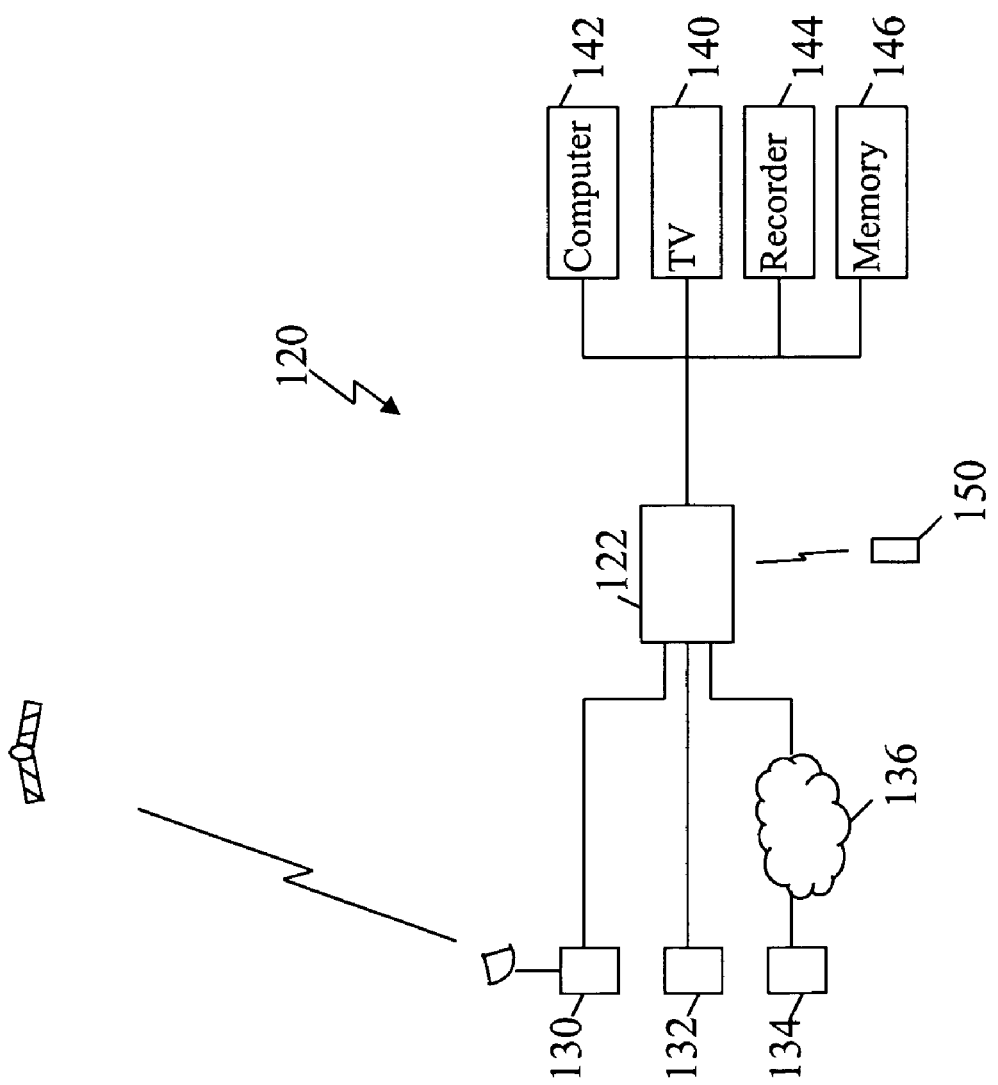
FIG. 1 depicts a simplified block diagram of a multimedia system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

FIG. 1 depicts a simplified block diagram of a multimedia system 120 according to some embodiments. The system includes a customer premise controller and/or processor 122. In many implementations, the customer premise controller is a set-to-box (STB) or other device positioned locally at a customer's premises and/or shared by several customers. The STB receives multimedia data, such as broadcast signals, through antennas and/or satellites 130, directly from one or more signal providers 132 (e.g., cable providers), from providers 134 distributing content over a network 136 (such as the Internet or other such distributed network), and other similar sources. The STB 122 processes the multimedia content (e.g., broadcast data) and displays the data on a display or television 140 or a computer 142, and/or directs the data to a recording device 144 (e.g., personal video recorder (PVR), digital video recorder (DVR), DVD writer, video cassette recorder, a digital memory recorder, and/or other such recording device) or memory 146. The STB can further cooperate with one or more wireless control devices 150 such as a remote control that dictates some control over the STB, typically utilized by a user.

The program content received at the STB 122 often is accompanied by information about the program content, often referred to as programming information and/or programming guide data. The STB utilizes this programming guide data to generate and/or allow users to access a guide or electronic programming guide (EPG). In some embodiments, the guide includes a listing of possible programs defined according to channels from which the individual programs can be tuned. The guide can further include additional information about one or more of the programs a user can potentially access, such as a brief description of the program, a rating of the program (G, PG, PG-13, R, etc.), content codes that define the type of content of the program (e.g., close-captioned, high-definition, sub-titled, violence, graphic violence, nudity, strong sexual contact, profanity, and other such codes), and other similar information. The STB 122 utilizes the information to generate the programming guide allowing users to view the guide and identify those programs the users might be interesting in viewing.

Figure 2:
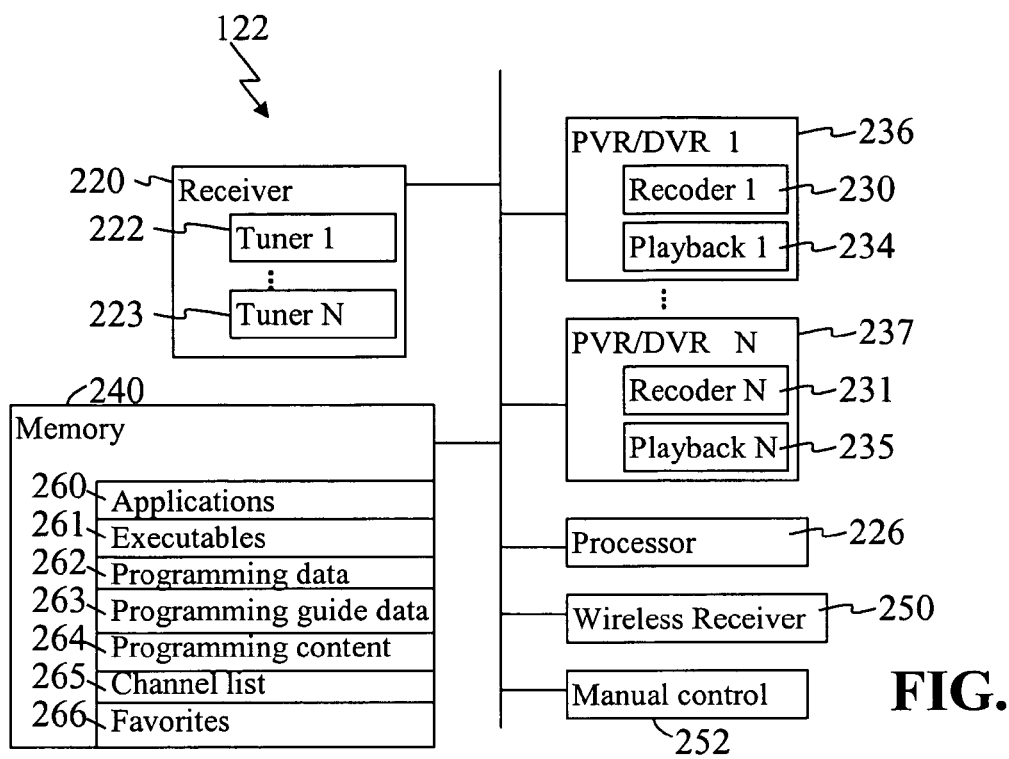
FIG. 2 depicts a simplified block diagram of a STB that can be utilized in the system of FIG. 1.

FIG. 2 depicts a simplified block diagram of a STB 122 according to some present embodiments. The STB includes a receiver 220 for receiving one or more programs from one or more sources (e.g., satellite 130, cable provider 132, etc.). The receiver includes at least one tuner 222 for tuning in selected channels, and in some embodiments includes more than one turner 222-223 to allow a user to tune in multiple channels. A processor 226 is further included to control the STB and to process data received from the content providers, data received from users (e.g., through remote controls 150), implement functions and control the content supplied to the TV 140, supplied to a computer 142 for storage and/or display, recorded through a recording device 144 and/or memory 146 and/or other devices.

In some embodiments, the STB 122 further includes one or more internal recorders 230-231 that receive programming data from the tuners and records the content. The recorders in some implementations direct the content to internal memory 240, and/or external memory or recording devices 144, 146. Similarly, the STB in some embodiments includes one or more playback devices 234-235 for retrieving program content from internal memory 240 or other memory and plays back the content on the TV. In some embodiments, the system and/or STB include one or more personal video recorder (PVR) and/or digital video recorder (DVR) applications 236-237 that incorporate the one or more recorders 230-231 and/or playback devices 234-235 to allow the recording and/or playback of received programming content. The recorders and/or playback devices, however, can be independent devices and/or separate from PVRs/DVRs. The STB typically further includes a wireless detector/receiver 250 that receives commands from a remote control unit operated by a user. Some embodiments further include manual controls 252 allowing a user to manually control the STB directly at the STB.

The memory 240 is utilized by the processor 226 to store applications 260, executables 261, program data 262 associated with one or more programs on channels accessible by the tuners 222-223, programming guide data 263 for a plurality of channels, program content 264, channel lists 265, favorites lists 266, and other similar data. The memory can include any type of memory and/or combinations of memory, such as non-volatile memory (e.g., read only memory (ROM)), random access memory (RAM), optical memory (e.g., digital video data (DVD), compact disc (CD)), and substantially any other memory and/or combinations of memory.

Figure 3:
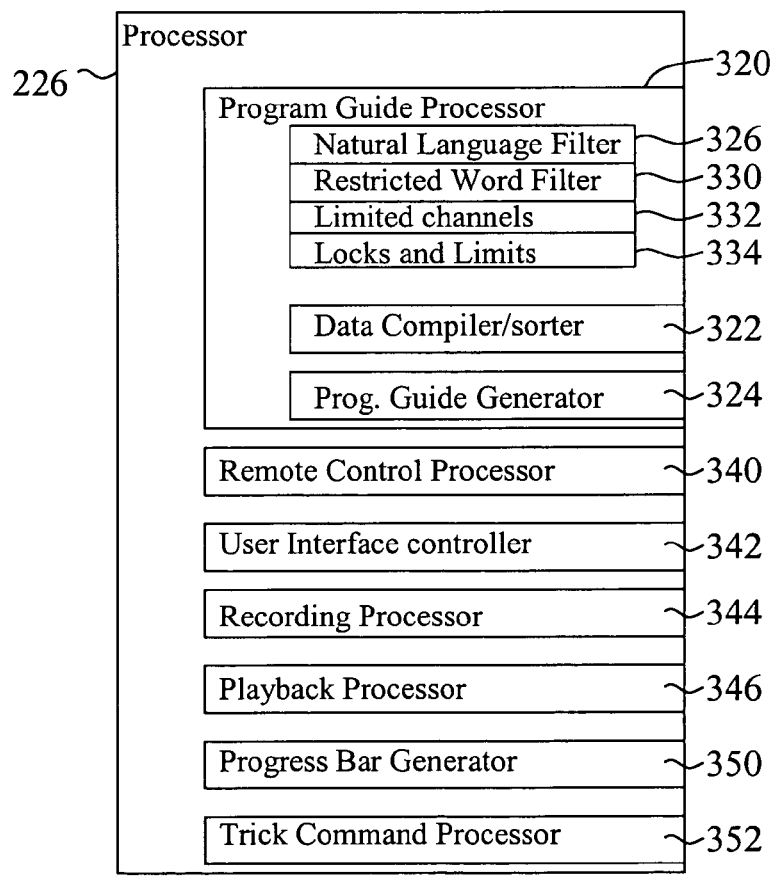
FIG. 3 depicts a simplified block diagram of the processor of FIG. 2.

FIG. 3 depicts a simplified block diagram of the processor 226 of FIG. 2 according to some embodiments. The processor includes a programming guide processor 320 that utilizes the programming guide data to generate a programming guide that can be viewed by users. The programming guide processor 320 includes a data compiler and sorter 322, and guide generator 324. In some embodiments, the programming guide processor 320 further includes one or more of: a natural language filter 326, a restricted words list filter 330, a limited channels filter 332, a locks and limits filter 334, and/or other processing functions.

The data compiler 322 retrieves the programming guide data and compiles, sort and/or categorizes the data so that the data can be displayed by the guide generator 324 according to a user's requested information. For example, the data compiler sorts the data to only display those channels defined in a users "Favorites List" as stored in memory 240 (or in memory internal to the processor 226).

The processor 226 further includes a control input processor 340 that receives and implements controls from the user (e.g., from a remote control 150, manual control or other such control). Similarly, the processor includes a user interface control 342 that implements control interfaces allowing users to configure and control the STB, the content available through the STB, and other features as described below.

In some embodiments, the processor includes a recording processor 344 and a playback processor 346 that cooperate with the one or more recorders 230-231 and the playback devices 234-235, respectively, to control the recording and/or playback. One or more progress bar generators 350 are further included in some implementations for generating status bars according to the status of one or more programs being recorded, played back, and/or otherwise accessed by a user as fully described below. Similarly, the processor in some embodiments includes a trick command processor 352 that implements commands directed to playback and recording of content as fully described below.

Figure 4:
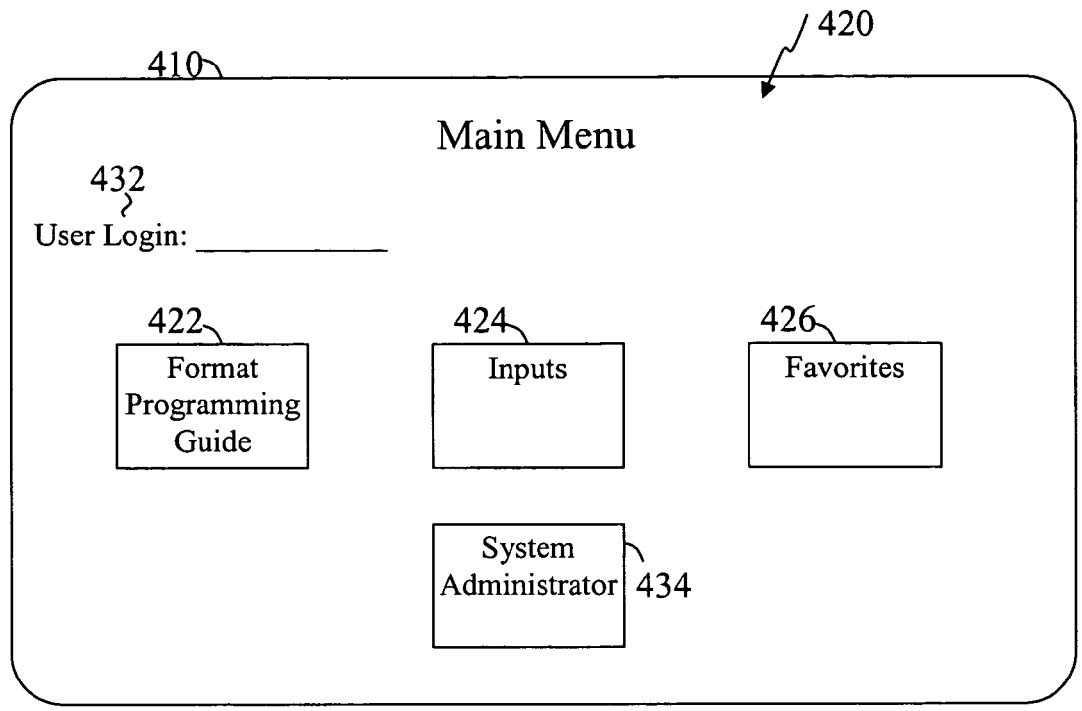
FIG. 4 depicts a simplified graphical representation of an example of a user control interface on a display.

FIG. 4 depicts a simplified graphical representation of an example of a user control interface 420 on a display 410 (e.g., a TV 140, computer 142 or the like). The interface allows users to control the display, the electronic programming guide, the data included in the programming guide, and the access to content associated with entries on the programming guide. The control interface 420 includes several options to access different functions of the programming guide. In some embodiments, the control interface includes a programming guide format option 422 to allow a user to define programming guide format, including such parameters as the appearance of the guide (color, size, number of entries, font size, etc.), the type of data to be included (long summary of programs, short summary of programs, ratings and other parameters (closed-caption, high-definition, violence, nudity, etc.), and other such appearance information. A signal input option 426 is included in some implementations to allow users to define which input ports are to receive programming content (e.g., satellite 130, cable 132, antenna, peripheral devices (CD players, VCR players, etc). and other such inputs). A favorites option 424 is included to allow users to define a favorites list so that the programming guide only displays those channels defined within a favorites list. Some embodiments further include other additional options including setting a time of the STB, and substantially any other option.

The control interface 420, in some embodiments, further includes a log-in prompt 432. The log-in prompt allows individual users to log-in to the system allowing the STB define the type and amount of information provided in the programming guide according to the logged-in user. For example, the present embodiments allow a system administrator (e.g., a parent) to prevent access and/or set up limited access to certain programming for some young viewers. Additionally, the control interface includes a system administrator option 434 that directs a user to a system administrator control interface 510.

Figure 5:
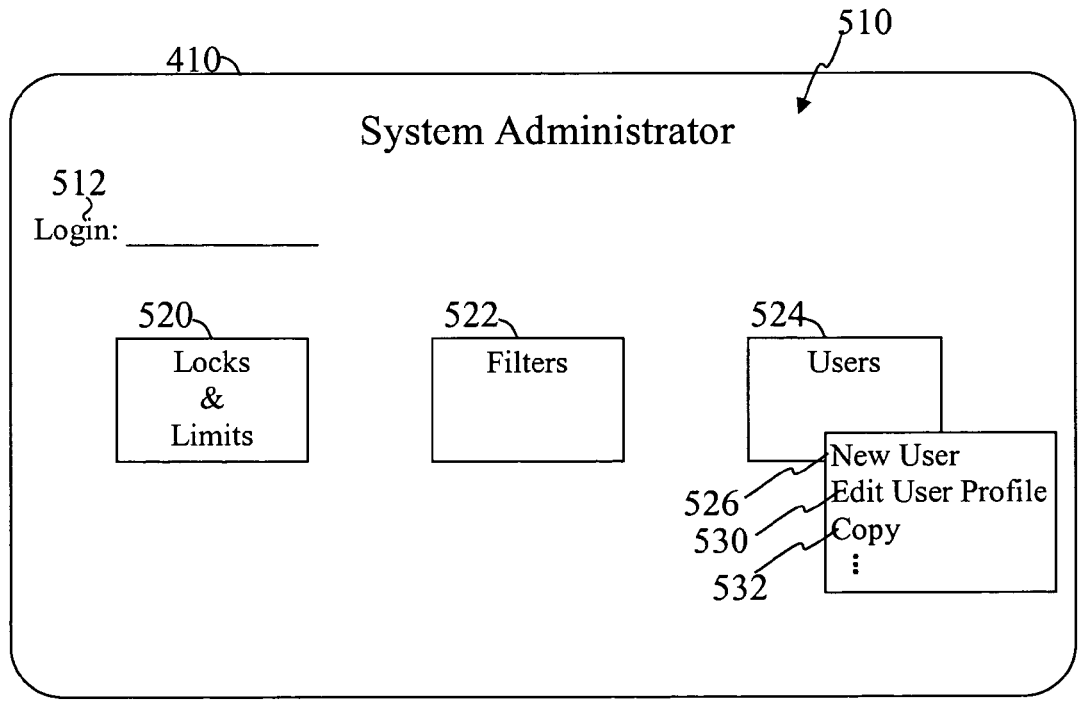
FIG. 5 depicts a simplified graphical representation of an example of a system administrator control interface on a display.

FIG. 5 depicts a simplified graphical representation of an example of a system administrator control interface 510 on a display 410. The system administrator interface 510 includes a log-in prompt 512 to limit the access to the control functions provided through the system administrator interface. Several control parameters and options are provided through the system administrator interface that allows the system administrator to control access to programming content and/or data displayed on the programming guide for users. In some preferred embodiments, the system administrator interface includes a locks and limits option 520, a filter option 522, a user profile option 524 and other similar options. The locks and limits option 520, and the filters option allow the system administrator to set system, global and/or user specific parameters that define programming access and/or access to the programming data included in the programming guide as fully described below.

The user profile option 524, in some embodiments, allows the system administrator to define one or more users, where the system administrator can define a scope of access for each specified user. As indicated above, users can log-in to the system. Upon log-in, the system only displays programming data and only allows that user to access programming content that is defined according to a user profile established by the system administrator. In some embodiments, upon selection of the user profile option 524, addition options are provided allowing the system administrator to enter a new user 526 which routes the system administrator to a user profile interface 1120 to define user access, edit user profile 530, copy user profile 532 which allows the system administrator to copy a profile then edit the profile reducing the amount of data the system administrator has to enter, and other such user profile controls.

Figure 6:
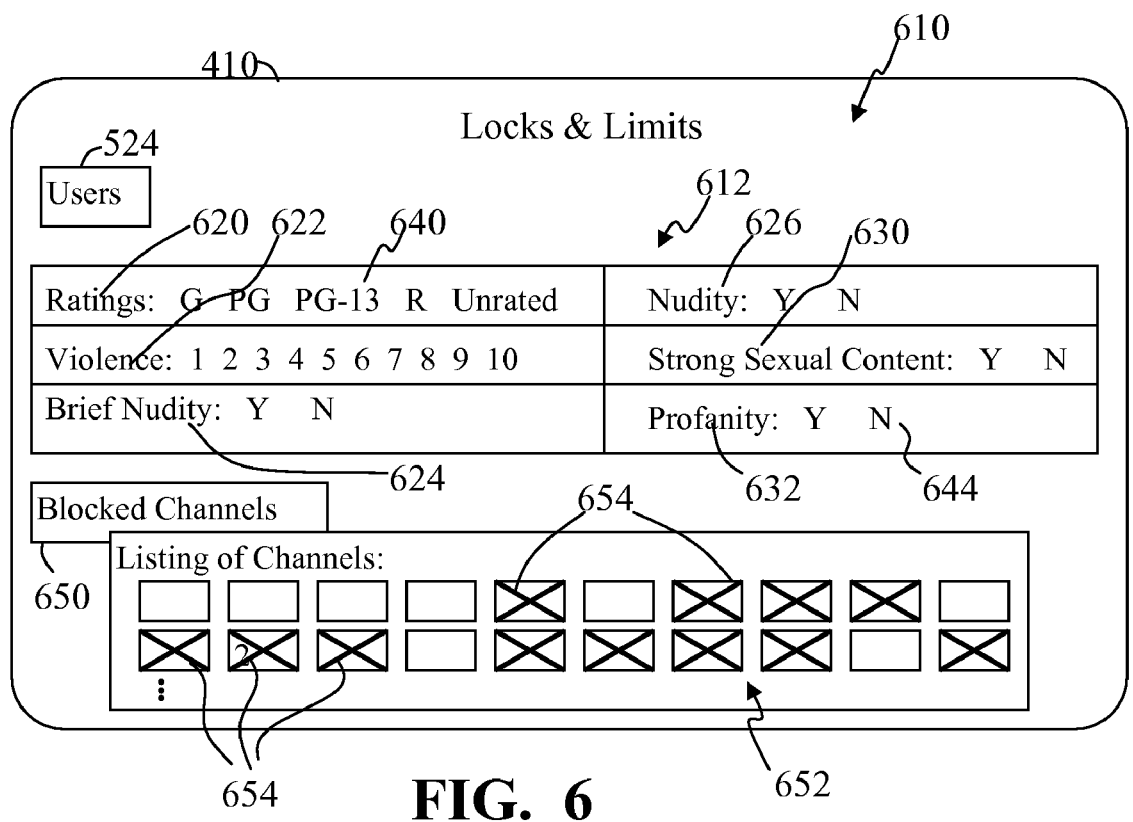
FIG. 6 depicts a simplified graphical representation of an example of a locks and limits control interface shown on a display.

FIG. 6 depicts a simplified graphical representation of an example of a locks and limits control interface 610 shown on a display 410. Again, the locks and limits control interface 610 is accessed as a global locks and limit, and/or is accessed for specified users in defining a specific user's profiles. The locks and limits allow the system administrator to define and/or limit the type of programming content that users can access through the system 120, and further allows the system administrator to define and/or limit the type of information displayed through the programming guide. In some embodiments, the system administrator can further access the locks and limits through a preference and/or favorites option (e.g., option 426) or other options. One of these preferences includes the locks and limits and/or allowed channel listing.

The locks and limits interface 610 includes any number of parameters 612 that are typically associated with programs and/or programming data received from the broadcasters and/or distributors. In some embodiments, the locks and limits interface 610 includes a user selection option 524, similar to the user selection option of the system administrator interface, that allows the system administrator to select one or more users for which the locks and limits that the system administrator specifies are to apply.

The parameters 612 of the locks and limits interface typically include a predefined list of known parameters. In some preferred embodiments, the processor 226 further searches programming data for additional parameters to be included. As such, the locks and limits list, according to some embodiments, is an expanding list that incorporates additional parameters as the processor detects the inclusion of additional parameters in the programming data.

The parameters 612 can include substantially any type of programming information that is supplied with the programming data and/or programming content. For example, the parameters can include a ratings option 620, a violence option 622, a brief nudity option 624, a nudity option 626, strong sexual content option 630, profanity option 632 and many other parameters. Some options allow the system administrator to define the level of the parameter that the user or users can access. For example, the ratings option 620 includes a listing 640 of the potential ratings (G, PG, PG-13, R, Unrated, etc.), allowing the system administrator to select all those ratings for which a user or users can have access, and/or simply specifies the highest level (e.g., PG-13) for which a user can have access. The listing 640 can be a continuously displayed list, a pull-down list, or other such lists. Other parameters include additional lists and/or options. For example, the violence parameter 622 in some implementations includes levels of violence. Some parameters are simply on/off parameters with a toggle allowing the system administrator to define whether the user or users should have access to such content. For example, the nudity parameter 626, in some embodiments, includes a on/off or Yes/No toggle 644 that allows the system administrator to define whether a user should have access to programming content and/or whether programming data should be included in a programming guide when a specific program includes nudity.

In some embodiments, the locks and limits interface 610 further includes channel block option 650. The channel block option allows the system administrator to define specific channels that are to be blocked for different users in defining each user's profile. In blocking the channel, the defined user cannot access the programming content associated with that channel. Similarly, by blocking a channel, the present embodiment eliminates this channel entry from the programming guide.

When the block channel option 650 is selected, in some implementations, a listing of channels 652 is provided (and/or a new block channel interface is provided) that lists the possible channels available through the system 120. Typically, only a portion of the available channels are displayed at a time and allows the user to scroll and/or traverse through the list to access the additional channels. The system administrator traverses through the list and select those channels 654 that that are to be blocked (alternatively selects those channels that are allowed) for the defined user(s) (e.g., first user). When the system administrator is finished, the unblocked channels define the active channel list for that user. The list shall be stored in memory 240 of the set-top-box 122.

For example, with a channel restricted from a first user, that channel could not be tuned in because it effectively does not exist in the channel line-up when the first user is logged-in. Further, because the channel effectively does not exist for the first user, the program guide does not display the channel information for that blocked channel, and thus the first user (e.g., a younger viewer) would not even have access to read the program information from the programming guide for a blocked channel. As described above, the system 120 can define multiple users, and each user (or group of users) of the system can be configured with separate channel lists. In some preferred embodiments, the system 120 allows the system administrator to also setup a default and/or guest user channel list. The guest user is the user that is active when all defined users are logged-out and/or initially invoked when the system is initially powered up. The default and/or guest user is fully described below. In some embodiments, individual users can similarly limit the channels for which they have access and/or limit the channels displayed on the program guide. However, individual users typically cannot change the channel lists as set by the system administrator.

When a user with a defined profile logs-in the channel list is read from the memory for that user. The user then only has access to those channels in the allowed list. The set-top-box operates as if the allowed channels of the list were the only channels available through the system and thus displays only channel information in the program guide that reflects those allowed channels. The locks and limits parameters override substantially any setting defined by the user. For example, if a first user defines a favorites channel lists, and subsequently the system administrator defines and/or edits the allowed channel list to exclude one or more of those channels defined in the favorites list, the favorites list is edited by the system to delete references to those channels, and/or alternatively ignores those channels in the favorites list that have been restricted.

Figure 7:
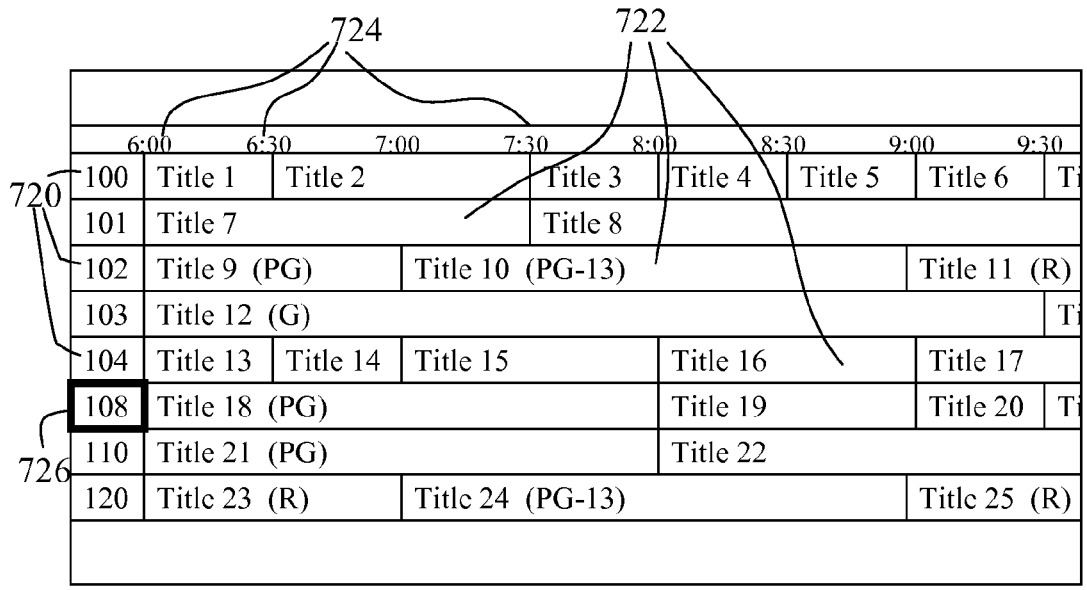
FIG. 7 depicts a simplified diagram of an electronic programming guide generated according to some embodiments.

FIG. 7 depicts a simplified diagram of an electronic programming guide 710 generated according to some embodiments. The programming guide 710 of FIG. 7 shows the programming guide without blocked channels and/or locks. The programming guide displays a portion of available channels 720 at one time (e.g., displays eight channels, ten channels, 15 channels, or substantially any number of channels). The programming data 722 associate with each channel is defined according to selected time periods 724. When viewing the programming guide, the user can select to switch the STB 122 to a desired channel by highlighting and/or shifting a highlighting indicator 726 over the channel and selecting an enter key or other similar key on a remote or manual controls and/or by directly entering the channel number. In some preferred embodiments, a user is further capable of obtaining additional information about a specific program listed in the program guide 710 by shifting the highlighting indicator 726 over a program title and again selecting a key (e.g., enter key) on the remote control or manual control.

Figure 8:
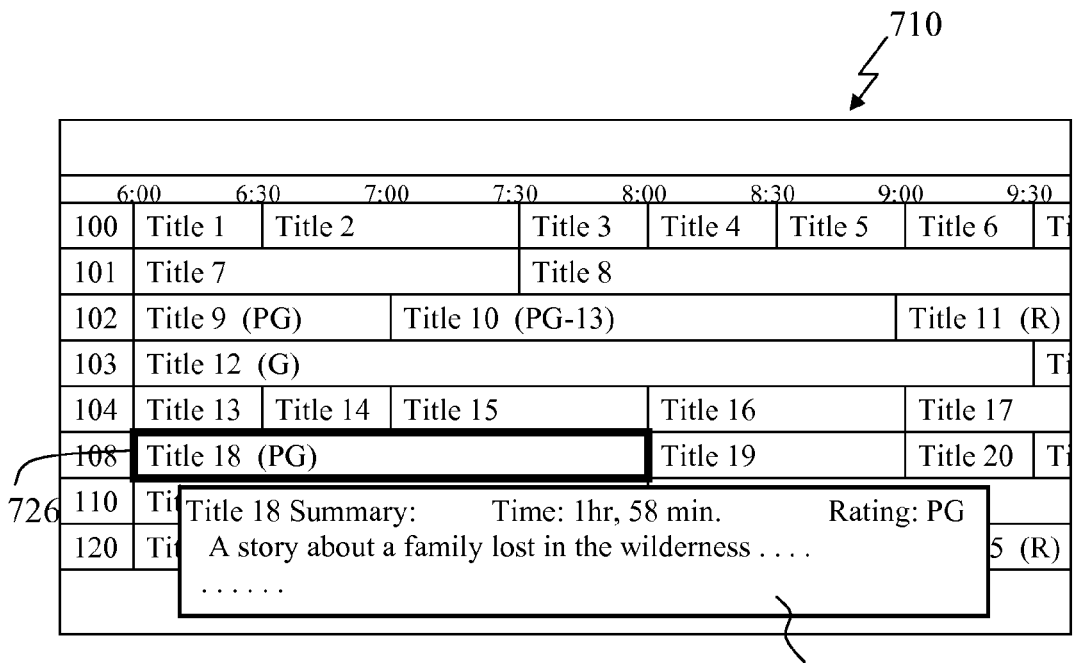
FIG. 8 depicts a simplified diagram of the programming guide following the selection of a specific program title.

FIG. 8 depicts a simplified diagram of the programming guide 710 following the selection of a specific program title. The programming guide includes a description or summary 820 of the selected program (e.g., Title 18 associated with channel 108). The summary can include substantially any information associate with the selected program that is supplied by the broadcaster/distributor.

Figure 9:
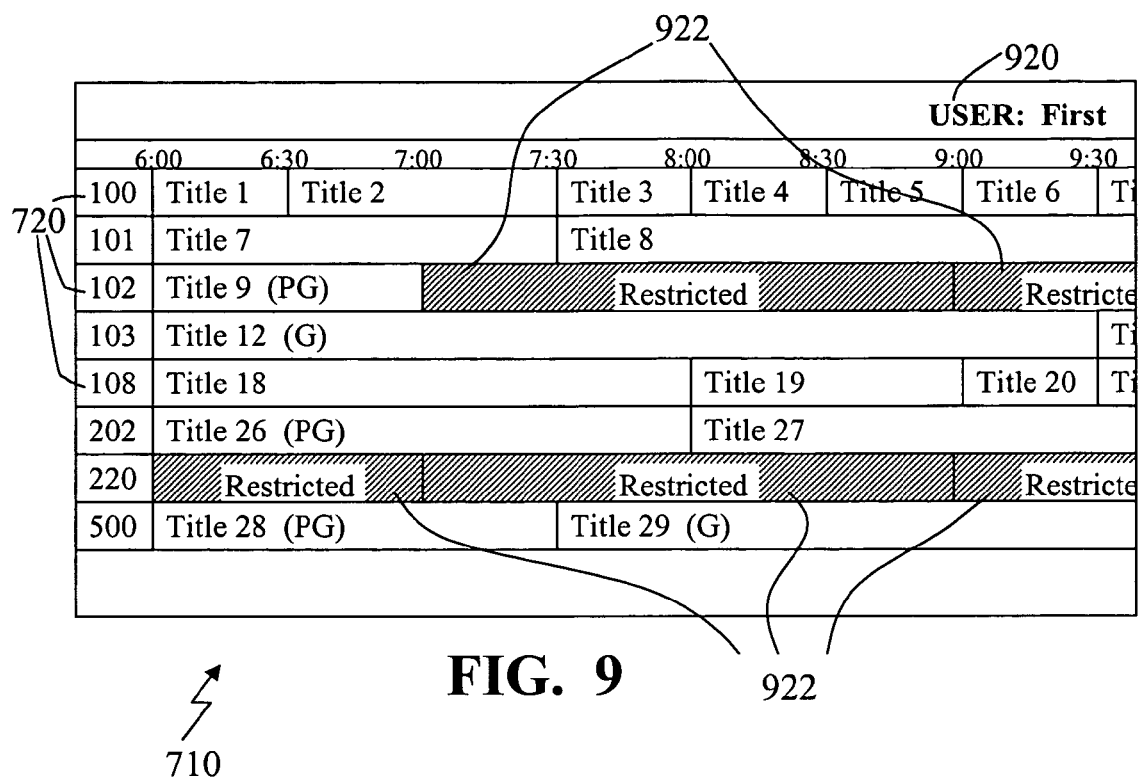
FIG. 9 depicts a simplified diagram of the electronic programming guide generated according to a first user profile and implementing locks and limits set by the system administrator for the first user.

The utilization of the locks and limits, as described above, allows the system administrator to limit the programming content accessed by a user (e.g., first user), and further limits the programming data displayed through the programming guide 710. FIG. 9 depicts a simplified diagram of an electronic programming guide 710 generated according to a first user profile and implementing locks and limits set by the system administrator for the first user. The programming guide 710 identifies the currently logged-in user 920 (e.g., first user). In the example shown in FIG. 9, the system administrator limited the first user's profile through the selection of locks and limits parameters to only those programs having ratings of G and PG, while preventing access to those programs having ratings of PG-13 and higher (e.g., R and unrated). As such, the present embodiment prevents the first user from accessing programming content having ratings greater than PG.

Similarly, the present embodiment generates the programming guide 710 such that those programs having ratings greater than PG are restricted 922. The locks and limits restrict the programming guide from being displayed with entries that fail to satisfy the conditions and/or parameters set by the system administrator. Typically, because the restricted title is defined at a time and with a duration, the positioning of the entry in the electronic program guide is preserved by replacing the entry with a default and/or generic entry (e.g., replacing the listing with a "Restricted" graphics box or other similar indicator).

The displayed programming guide is further dictated by the allowed channel selection (and/or blocked channel selections) specified by the system administrator. As such, the present embodiment further limits the display of the programming guide to include only those channels 720 the first user is allowed to access. Therefore, the programming guide does not include the blocked channels (e.g., not displaying channels 104, 110, 190) and only showing those allowed channels (e.g., showing instead channels 202, 305, and 500). Further, the present embodiments prevent the first user from accessing programming summary data 820 for those channels block, as well as for those programs restricted according to locks and limits. Therefore, young viewers, for example, are restricted from accessing inappropriate data associated with inappropriate programming content.

In some embodiments, the present embodiments generate the programming guide 710 to display the predetermined number of channels (e.g., eight channels). Each program to be display in the program guide window 710 is scanned prior to display to determine whether the program content is restricted based on the locks & limit settings. For those programs that are restricted, the program title is removed from the program guide and a generic title is inserted (e.g. Restricted, Restricted Program, or the like). Since the program title is removed, access to the summary and/or description of that program is also restricted. In some implementations, a generic description (e.g., Restricted) is alternatively provided if a user attempts to view a summary of the restricted program content. In some embodiments, all entries of a programming guide are evaluated prior to displaying any of the programming guide, and those programs that are to be restricted as well as any channels that are defined as blocked for a defined user are flagged and/or eliminated. As such, when the programming guide for the user is displayed, the guide does not show the blocked channels and incorporates the generic title (e.g., Restricted) into the displayed guide. In some alternative embodiments, as the program guide is traversed by the user (for example user scrolls up or down to display additional channels, or scrolls right or left to display other times (and thus other programs)), new or subsequent program titles or groups of titles to be displayed are evaluated against the locks & limits settings and/or channel blocks. Thus, the program titles are filtered as the program guide is displayed while the user shifts through the guide.

Figure 10:
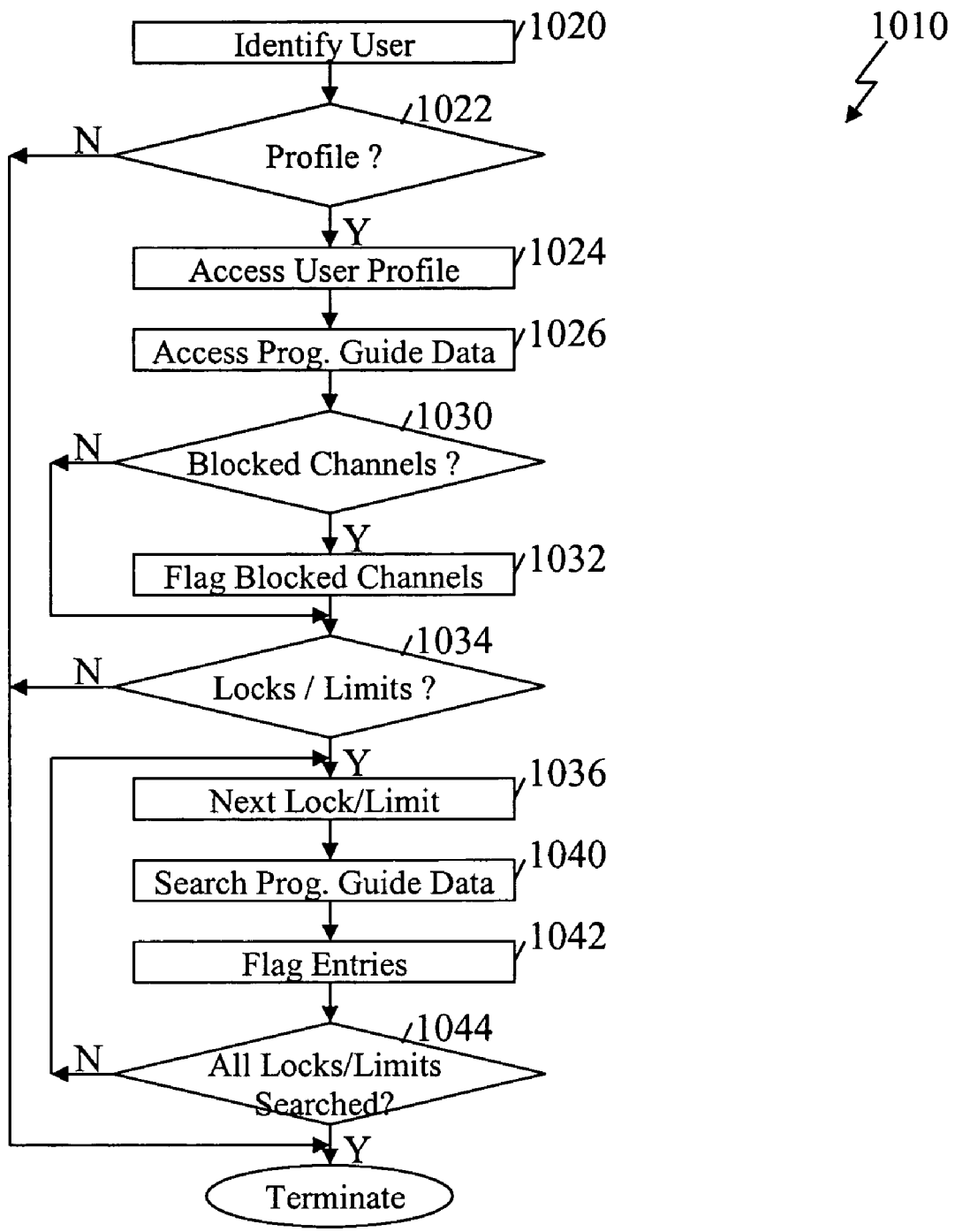
FIG. 10 depicts a simplified flow diagram of a process for applying locks and limits as set by the system administrator for a first user.

FIG. 10 depicts a simplified flow diagram of a process 1010 for applying locks and limits as set by the system administrator for a first user according to some embodiments. In step 1020 a user is identified (e.g., first user, default/guest, etc.). In step 1022, the process determines whether a user profile is established for the identified user. If no profile is established for a registered user, the system has no locks or limits, no blocked channels, and no filter (as fully described below), and the process 1010 terminates.

When a profile exists, step 1024 is entered where the user profile for the identified user is accessed. In step 1026 the programming guide data is accessed. The programming guide data is typically received from the broadcaster/distributed and stored in memory 263. For example, the programming guide data is stored as a database of data containing the relevant information, such as channel numbers, time periods, titles associated with channel numbers and time periods, program description/summary data associated with the titles (when available), parameters 612 that further define the programming content (e.g., high-definition, ratings, violence level, nudity, etc.), and other such data.

In step 1030, the process determines from the user profile whether there are blocked channels defined. When the profile does not have blocked channels the process continues to step 1034. Alternatively, when the profile includes defined blocked channels, step 1032 is entered where the programming guide data is searched for the blocked channels and the blocked channels are flagged with a block flag for the specific user. For example, the database maintains flagging information for each registered user (including a guest and/or default if defined). In some alternative embodiments, the channel and associated data (e.g., titles, descriptions, etc.) to be blocked are simply removed from the programming guide data and a revised programming guide data is saved for the identified user.

In step 1034, the process determines if the user profile includes locks and limits. If there are no locks and limits defined, the process 1010 terminates. When locks and limits are defined, step 1036 is entered where a first or next lock/limit (e.g., limit programs that are PG-13 or greater) is identified. In step 1040, the programming guide data is evaluated based on the lock and/or limit. In step 1042, the titles that are to be limited are flagged with a limit flag. In step 1044, it is determined whether all of the locks and limits have been evaluated. If locks and limits remain, the process 1010 returns to step 1036, otherwise the process terminates.

In displaying the programming data the system identifies those channels that have been flagged with block flags for the current user and prevents those channels from being displayed. Similarly, the system identifies those titles and/or summaries that have been lock/limit flagged (or filter flagged as described below) and replaces them with the generic entry (e.g. "Restricted"), and displays them with the generic entry.

Figure 11:
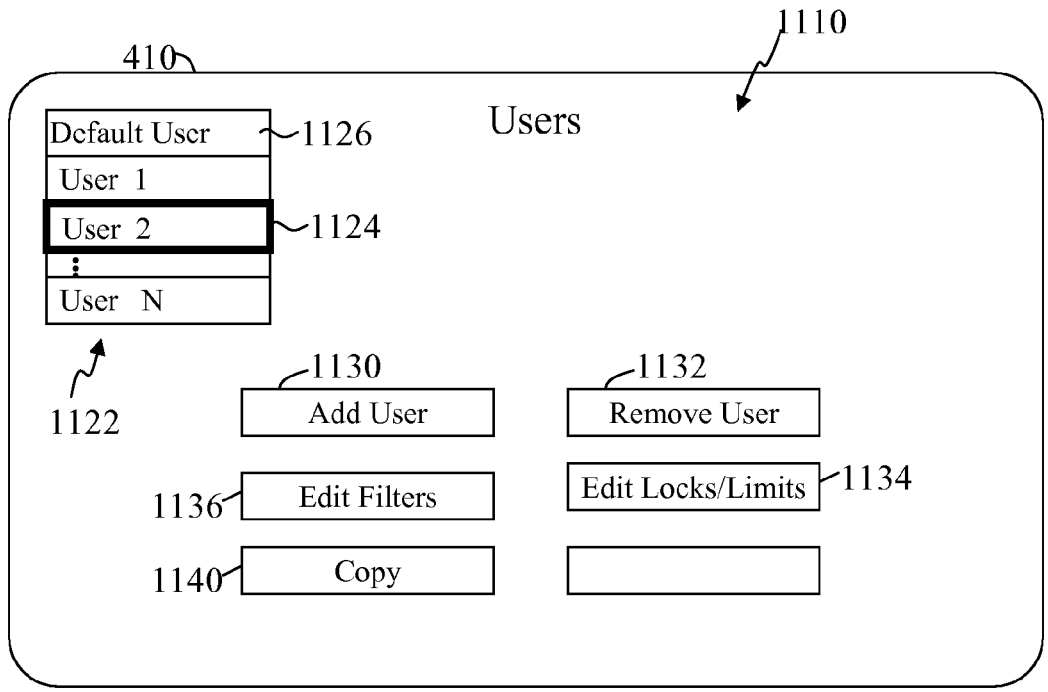
FIG. 11 depicts a user profile interface on a display.

FIG. 11 depicts a user profile interface 1110 displayed on a display 410. The present embodiments allow multiple users to be defined, with each user having a defined profile. The system administrator defines at least a portion of the profile of a user by accessing the locks and limits interface 610, a filtering interface 1220 as described fully below, and/or through the user profile interface 1110. The user profile interface 1110 is accessed, at least in some embodiments, through the selection of the user option 524 of the system administrator interface 410. The user profile interface includes a list 1122 of previously entered users (e.g., user 1, user 2, user N) and can include substantially any number of users, limited only by the resources of the system 120. A highlight or selector box 1124 allows a user (e.g., system administrator) to select a user to gain access to a user's profile.

In some embodiments, the user list 1122 further includes a user entry for a default or guest user 1126. As described above, the guest or default user is activated once a user logs-out and/or upon an initial start-up and/or power-on of the STB 122. The system administrator defines the profile of the default user in substantially the same manner as defining a specific user. In some embodiments, the default user can be equated to one of the specifically defined user's profiles (e.g., user 1 profile). As such, the system administrator does not have to specifically define a default profile, and the default user profile tracks the changes made by the system administrator to the specific user's profile. Additionally and/or alternatively, an independent profile is generated for the default user 1126, and is automatically equated to one of the specifically defined users having the most limited access to potentially available program content. In some alternative embodiments, the system administrator can copy a specifically defined user's profile (e.g., the users having the most limited access) as the default user profile. The default user profile can be implemented and/or altered by the system administrator through similar processes used to implement and/or alter user's profiles.

In some embodiments, the user profile interface 1110 further includes options to add one or more users 1130, remove one or more users 1132, edit locks and limits 1134, edit filters 1136, and other options. Further, the user profile interface can include a profile copy option 1140 that allows the system administrator to select a user and copy the profile for an additional user. This can reduce the amount of data entering the system administrator has to perform in creating a profile.

Figure 12:
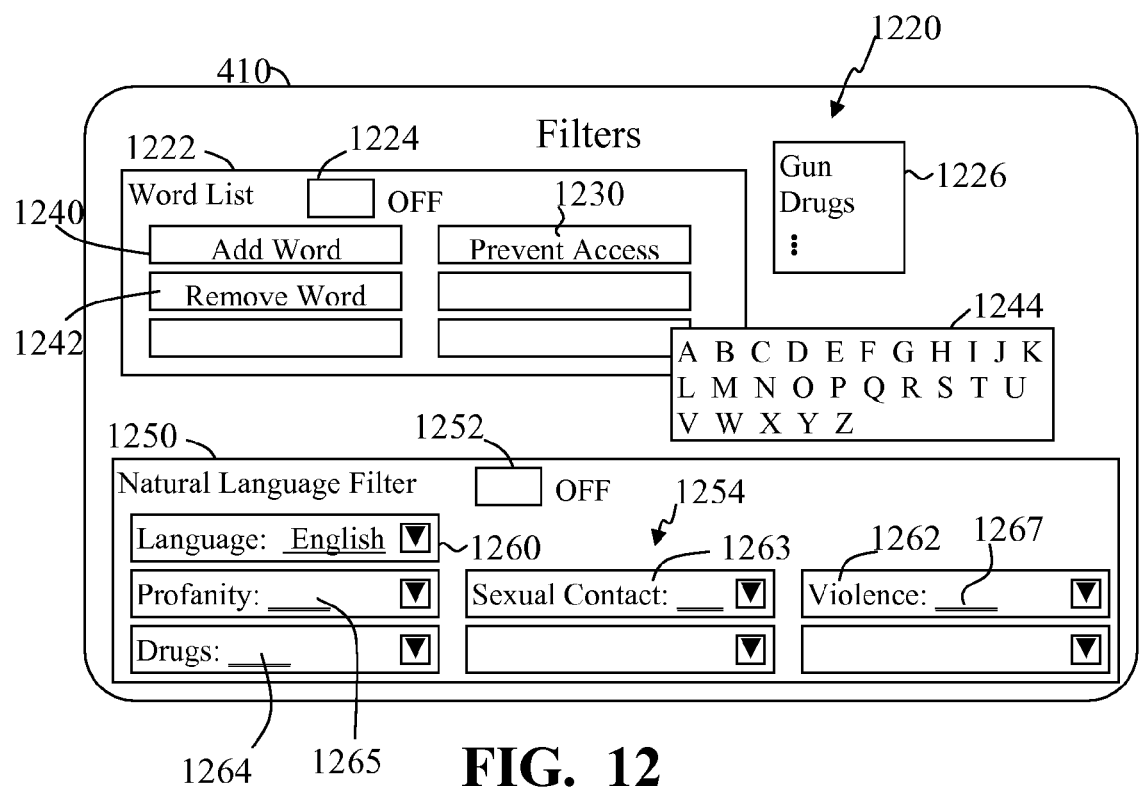
FIG. 12 depicts a simplified graphical representation of an example of a filter control interface on a display.

FIG. 12 depicts a simplified graphical representation of an example of a filter control interface 1220 on a display 410. The system administrator interface also allows the system administrator to define and/or employ one or more filters that are additionally and/or alternatively applied to the programming content and/or programming guide data displayed and accessed through the programming guide 710. By selecting the filter option 522, the system administrator is directed to a filter control interface 1220. The filter control interface 1220 provides the system administrator with access to one or more filters depending of the implementation of the system 120.

In some embodiments, the filter control interface includes a word list filter 1222. The word list filter includes an enable or on/off function 1224 to enable or disable the word filtering. A list of words and/or phrases 1226 is utilized by the word list filter to filter the programming guide data and/or access to programming content. The words and/or phrases of the word list 1226 are included into the list by the system administrator and/or system, and can include substantially any word or phrase that the system administrator want to be filtered (e.g., gun, drugs, and other such words that the system administrator does not want a viewer to access). The list of words or phases is stored in memory.

The program guide processor 320 accesses the list and searches the programming guide data for each of the words and/or phrases listed in the word list 1226. When an entry in the programming guide data is identified as including one or more of the words/phrases of the list, the entry is flagged. Upon display of the programming data, any entry flagged as including one or more words from the word list is removed from the programming guide and/or identified as restricted. Typically, the programming guide data that is searched includes the title, summary/description and other data associated with a program to be potentially displayed on the programming guide. Some embodiments further prevent users from accessing program content (e.g., selecting the channel) that is associated with the entry in the programming guide that is restricted and/or removed from the guide. Alternatively, in some implementations just the word(s) are removed from the entry in the programming guide. The system administrator can define the level of filtering according to options in the filter control interface 1220, such as prevent access to content option 1230, remove word(s) from programming guide data, and/or other similar options.

In some embodiments, the word list filter 1222 also allows the system administrator (and/or other users in some implementations) to add words or phrases to the word list 1226 through the selection of an add word option 1240. Similarly, the system administrator can remove words and/or phrases from the word list by selecting the remove word option 1242. A list of letters and/or a key pad 1244 is included (and/or displayed after selection of the add option 1240) to allow the user to enter words or phrases. The displayed key board can be operated through the remote control 150 and/or manual controls. Additionally and/or alternatively, an external keyboard is coupled with the system 120 is some embodiments to allow the user to directly type in the words and/or phrases.

Figures 13, 14:
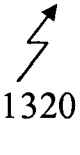
FIG. 13 shows a simplified diagram of an electronic programming guide generated according to some embodiments, prior to being filtered by the word list filter.
FIG. 14 shows an electronic programming guide generated according to some embodiments, after a word filter option is applied to the programming guide data.

FIG. 13 shows a simplified diagram of an electronic programming guide 1320 generated according to some embodiments, prior to being filtered by the word list filter (and prior to applying other locks and limits as described above). Similarly, FIG. 14 shows the electronic programming guide 1320 generated according to some embodiments, after the word filter option is applied to the programming guide data, where the word list includes the words "drug" and "gun". It is noted that the entries 1324, 1326 entitled "Guns In The City" and "Drugs On The Street" have been restricted 1424, 1426 according to the word filtering. Some implementations further prevent a user from accessing and/or viewing the program associated with the restricted entries of the programming guide.

The word list filtering is typically independent of other locks and limits settings, and utilized in cooperation with the locks and limits. Before the program guide 1320 is displayed, the restricted word list is accessed in memory. The words and/or phrases of the word list are compared against words in the titles and descriptions/summaries. When a title and/or summary is identified as containing a restricted word, that entry in the program guide is restricted and the title and description are replace in the programming guide database with a generic title and description.

In some embodiments, the broadcaster and/or distributor of program content employ a delayed description fetch, where a description of a program is downloaded at the time the program title is highlighted as the user traverses through the program guide. The information fetched is compared against the restricted word list (and/or locks and limits) prior to display. If a word or phrase in the description matches words in the restricted word list, the description information is restricted and/or replaced with a generic description. In this instance, the title is displayed in the program guide, however, the description information is restricted, and in some implementations, the user is prevented from accessing to the program content.

Referring back to FIG. 12, in some embodiments, the filter control interface 1220 includes a natural language filter 1250. The natural language filtering allows the system administrator to enable programming guide title and description filtering using a natural language processor. Natural language processing is an algorithm that determines the definition of one or more words based on the context and/or use of corresponding words. By combining a series of words, the meaning based on the order of the words is interpreted by the natural language processor. In some embodiments, a commercially available natural language processor is employed to determine uses and/or meanings of words in the title and/or summary of programming data. In the present embodiments, the natural language processor is configured to identify one or more words that are to be filtered (e.g., words or phrases that are offensive or inappropriate as defined by a system administrator) for a specific viewer/user, groups of users and/or globally for all users.

The natural language filter 1250 of FIG. 12 includes an on/off function 1252 for enabling and/or disabling the filter. Again, the filtering through the natural language filter can be employed as a global setting and/or implemented for specific users. The natural language filter 1250 further includes different categories 1254 allowing the system administrator to restrict access. The options selected by the system administrator are stored in memory.

The categories 1254 can include substantially any category. For example, some embodiments provide for a language selection 1260 allowing the system administrator to set the natural language processor to filter according to a predefined language (e.g., English, Spanish, French, and substantially any language). Some embodiments further allow multiple languages to be set. The language selection can include a pull-down menu that lists the possible languages from which the system administrator selects. The categories can further include substantially any category that a system administrator would want to filter, such as violence 1262, sexual content 1263, drugs 1264, profanity 1265, and substantially any other such categories. In some embodiments, the categories are simply enabled or disabled (e.g., through a toggle switch selected by the system administrator). Additionally and/or alternatively, some embodiments provide one or more categories with levels 1267 of offensiveness or obscenity that are selectable by system administrator (e.g., levels from zero to 10 (or some other value); or some other level indication), which can be specified directly by the system administrator by entering a number, selecting from a pull-down, positioning a slider on a slide bar, or other such selection procedures. The categories 1254 allow the system administrator to refine the natural language filtering and further define what the filter is to identify as a word or words that are to be restricted and/or blocked according to their usage (e.g., obscene, vulgar, profane, sexually explicit, and other such usage).

When the context of the title and/or description is interpreted to be offensive and/or is identified to include language that is to be filtered, the title and description pair are restricted from the programming guide. Again, because the title is represented in the program guide by a time and duration, its position in the electronic program guide is preserved, in some implementations, with a generic title (e.g., Restricted).

This setting for the natural language filtering allow the filtering to operate independent of other filtering, locks and/or limit settings. Typically, however, the natural language filtering in operated in cooperation with the other filtering, locks and/or limits. In some embodiments, the natural language filtering overrides the word list filter. For example, if a title is restricted because it includes a word defined in the word list, the natural language filter further analyzes that entry to determine the usage of the word. If the natural language filtering determines that the word is not used in an offensive or obscene manner as defined by the system administrator, the title is not filtered even though the title includes a word from the word list.

When a user initiates a display of the electronic program guide, the STB standard algorithm (e.g., as defined by the user and/or system administrator) for determine which channels to display and how much program information to display at one time is employed. Before displaying the program guide, the natural language processor options are read from memory and the programming guide data is filtered prior to display.

When the electronic program guide processor 320 generates a programming guide database for display, the natural language filtering scans the database for offensive and/or inappropriate material according to the defined categories 1254 and/or options. When the natural language filtering detects restricted context, that entry in the program guide is restricted and the title and description is replaced in the displayed programming guide with a generic title and/or description. In some preferred embodiments, the user is prevented from accessing the program content for those entries that are restricted.

For applications that have a delayed description fetch that, for example, download descriptions at the time the program-title is highlighted as the user traverses through the program guide, the fetched description information is initially processed by the natural language filtering before the description is displayed. If the natural language processing determines that the context of the downloaded description includes offensive language based on the set categories, the description is not displayed and a generic description is alternatively provided. In this case, the title is displayed, while the description information is not displayed.

In some implementations, the programming guide processor 320 generates a complete programming guide database of all available data once filtered according to the natural language filtering (and other filtering and/or locks and limits) and records the programming guide as a database in memory. Upon activation of the programming guide, the programming guide processor accesses memory to retrieve the appropriate entries to be displayed (e.g., eight entries). As the user scrolls through the data, the programming guide processor retrieves the subsequent entries requested by the user without having to further filter.

In some alternative embodiments, the programming guide is generated as the user repositions/scrolls through the guide (e.g., through different channels, and/or through different time periods) to display other channel information. A database of entries for the new data to be displayed is generated for each change of the programming guide. Before displaying the additionally information, the natural language filter is applied (when enabled). Thus, as the user moves through the programming guide, the programming guide is filtered based on the natural language filtering.

Figure 15:
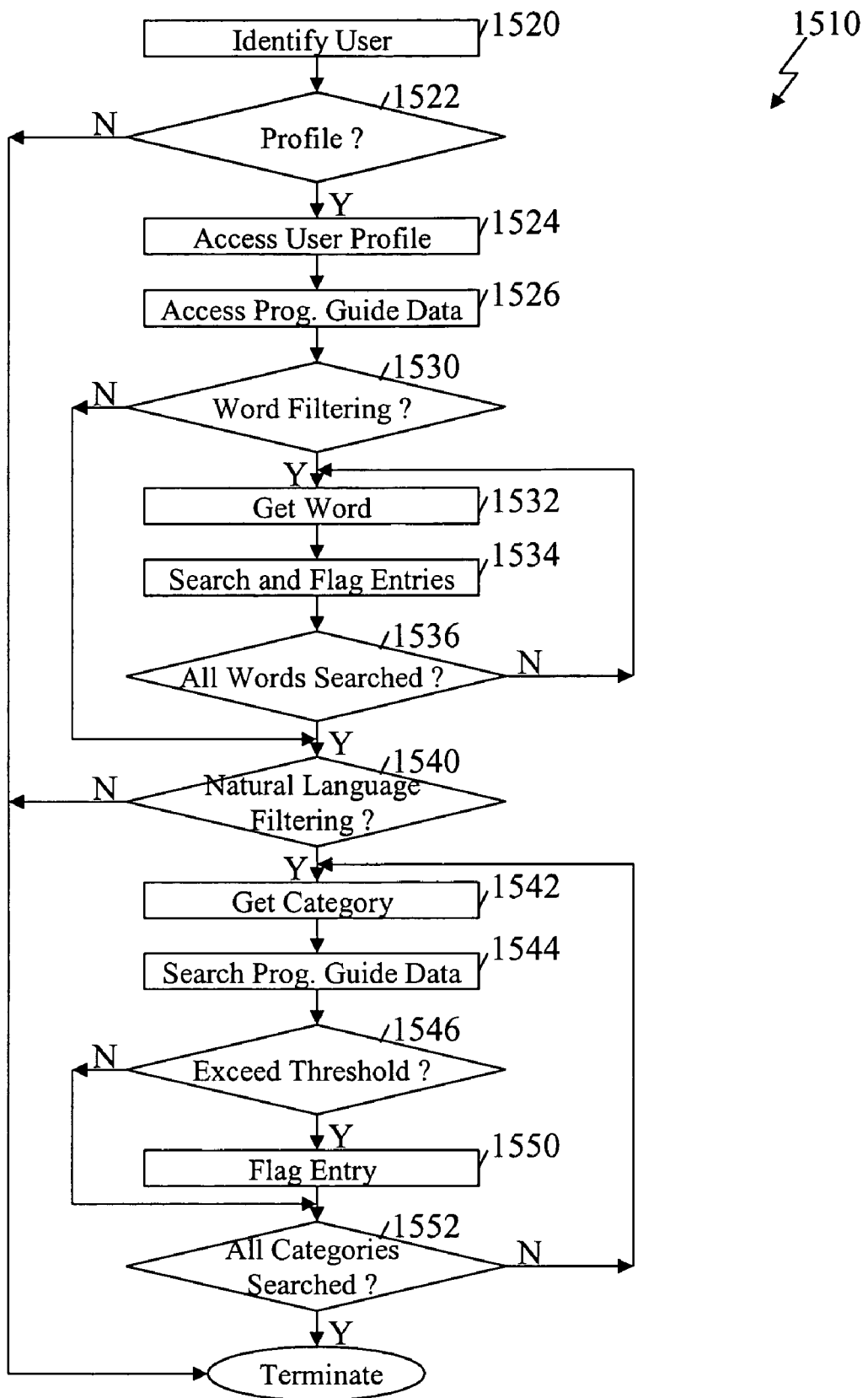
FIG. 15 depicts a simplified flow diagram of a process for word list and/or natural language filtering as set by the system administrator for a first user.

FIG. 15 depicts a simplified flow diagram of a process 1510 for word list and/or natural language filtering as set by the system administrator for a first user. In step 1520 a user is identified (e.g., first user, default/guest, or other defined user). In step 1522 the process determines whether a user profile is established for the identified user and/or whether the profile includes filtering. If no profile is established for a registered user and/or no filtering is defined the process 1510 terminates. When a profile exists, step 1524 is entered where the user profile for the identified user is accessed. In step 1526 the programming guide data is accessed.

In step 1530 it is determined whether the filtering includes word filtering. When the filtering does not include word filtering, the process continues to step 1540. Alliteratively, step 1532 is entered where a first word (or a subsequent word as described below) of the word list is identified. In step 1534 the titles and descriptions/summaries of programming guide data is searched for the restricted word, and titles are flagged with a filter flag or restriction flag when a restricted word is found in the title and/or summary. Typically, the word search is implemented to search for the specific words and derivatives of the word (e.g., when the restricted word is gun, the word guns is identified as restricted), however, in some embodiments, the filter interface allows the user to disable and/or enable derivates for words. In step 1536 the process determines whether all of the words of the word list have been searched. When all of the words have not been searched the process returns to step 1532 to identify the next word of the list.

In step 1540 it is determined whether natural language filtering is to be performed. If natural language filtering is not to be performed, the process 1510 terminates. Alternatively, step 1542 is entered where a first or subsequent category (e.g., a specified violence level) is identified. In step 1544 the programming guide data (titles, summary, and/or parameters) is searched for natural language according to the identified category (e.g., violence). In step 1546 it is determined whether identified natural language defining violence exceeds the level or threshold set by the system administrator. If the level is not exceeded the process continues to step 1552.

If the level is exceeded, the title that has natural language that exceeds set threshold is flagged using a filter or restriction flag in step 1550. In step 1552 it is determined whether all natural language categories have been search, and returns to step 1542 when additional categories are to be searched. Alternatively, the process 1510 terminates.

Figure 16:
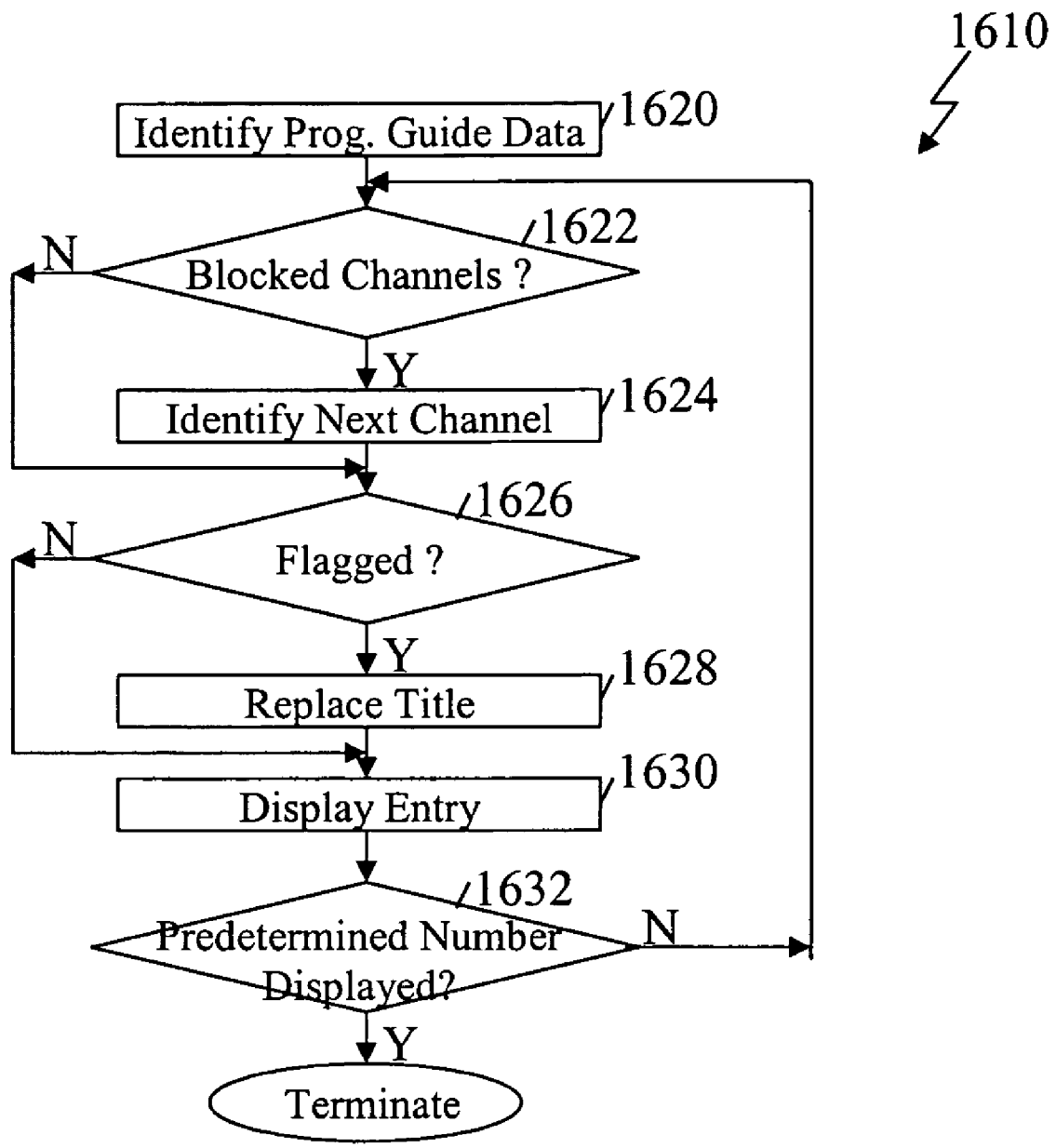
FIG. 16 depicts a simplified flow diagram of a process for displaying a programming guide according to some embodiments.

FIG. 16 depicts a simplified flow diagram of a process 1610 for displaying a programming guide according to some embodiments. In step 1620 the process determines which portion of programming guide data to display. In some embodiments, determining which portion of the programming guide to display includes determining a starting channel (e.g., the channel currently being viewed by the user, a channel with the lowest number, a specific channel selected by the user, or some other starting channel), the number of channels to be displayed (e.g., ten channels and titles are displayed), and a period of time to be displayed (e.g., display titles in that can be accessed between 8:00 PM and 11:00 PM). In step 1622 it is determined whether a first or next channel of the portion of the programming guide to be displayed is block flagged. If the channel is not block flagged, the process continues to step 1626, otherwise, step 1624 is entered where the channel is ignored, the next channel in the programming guide is identified, and the process returns to step 1622 to evaluate the next channel.

In step 1626 the process determines whether one or more titles or summaries for the channel being evaluated and during the period of time to be displayed are flagged (e.g., whether a title is flagged with a lock/limit flag and/or a filter flag). If the titles are not flagged, the process continues to step 1630. If a title is flagged, the title (and associated summary) is replaced in step 1628 with a generic title (and summary). In step 1630 the channel and associated non-restricted titles and generic titles are displayed. In step 1632 the process determines if the predefined number of channels (e.g., 10 channels) are displayed. When the predefined number of channels are not displayed, the process returns to step 1622 to evaluate a next channel of the programming guide data, otherwise the process terminates.

In some alternative embodiments, the programming guide data is revised to remove entries that are blocked and/or restricted and saved as a revised programming guide data. Upon display of the programming guide, a process determines whether revised programming guide data was stored. If revised programming guide data was stored, the display of the programming utilizes the revised data and does not have to analyze the data as the programming guide is displayed. In some implementations, when a user logs in, the programming guide data is evaluated based on the blocked channels, locks and limits, filtering and other restrictions, and the revised programming guide data is stored for use in generating the displayed programming guide.

FIG. 17 depicts a simplified diagram of an electronic programming guide 1720 generated according to some embodiments prior to applying one or more filters. The programming guide includes a fixed number of channels 720 and data 722 for each channel for the defined periods of time 724. The programming guide 1720 is shown with a first title 1722 selected such that a summary 1724 is also displayed.

FIG. 18 depicts a simplified diagram of the electronic programming guide 1820 similar to the programming guide 1720 of FIG. 17 generated according to some embodiments after word and/or natural language filtering is applied. The programming guide 1820 filtered based on a natural language filter with categories defined by the system administrator for violence and sexual content at low levels to significantly limit the first user's access to content containing references and/or showing violence and sexual content. Referring to FIGS. 17 and 18, the filtered programming guide 1820 is shown with second and third titles 1730 and 1732 of programming guide 1720 restricted 1822 in FIG. 18. This is because the natural language filter detected the language demonstrating violence ("Gang Fights on the Street") and sexual content ("Sex In The City"). The natural language filtering did not filter out the first title 1722 "Nature's Fight For Life" even though the word "Fight" is included because the use is not obscene and/or inappropriate. Similarly, the first summary 1724 is also not restricted even though the summary includes the word "sex" ("because male sex is often brightly colored"), because the natural language processor determined that the use of the word was not an obscene or inappropriate use.

Figure 19:
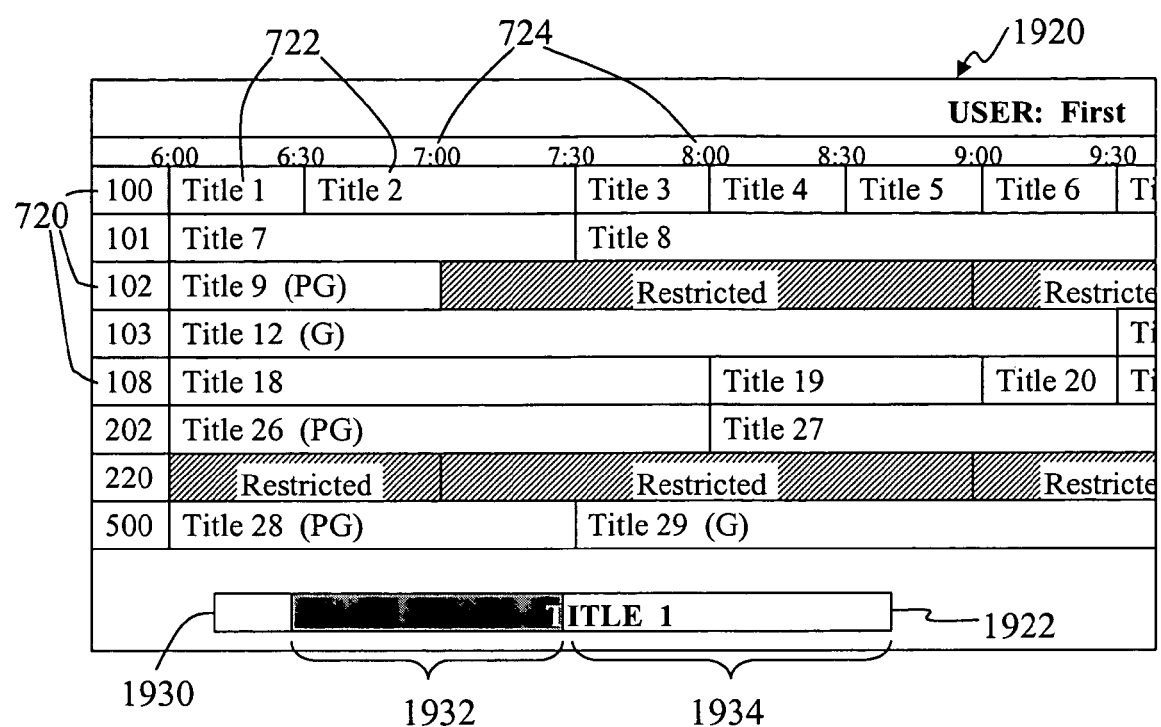
FIG. 19 depicts a simplified diagram of an electronic programming guide generated according to some embodiments.

In some embodiments, the programming guide includes one or more status or progress bars that define the state of programs currently being accessed by the STB for viewing, recording and/or playback. FIG. 19 depicts a simplified diagram of an electronic programming guide 1920 generated according to some embodiments. The programming guide 1920 includes listings of channels 720 and the titles of programs 722 that can be accessed on the prescribed channels at the specified time 724. A progress bar 1922 is further shown that identifies the channel 1930 that is currently being viewed, the time elapsed 1932 in the program and the time remaining 1934 for the program. Other data can similarly be included and/or depicted with the progress bar.

In some embodiments, the program being viewed is a recorded program and is being played back by the user. As such, the progress bar 1922 defines the status of the playback. One or more progress bars are similarly provided in some embodiments, during some implementations for the recording of programs. Still further, some embodiments display one or more progress bars 1922 independent of the programming guide 1920.

Figure 20:
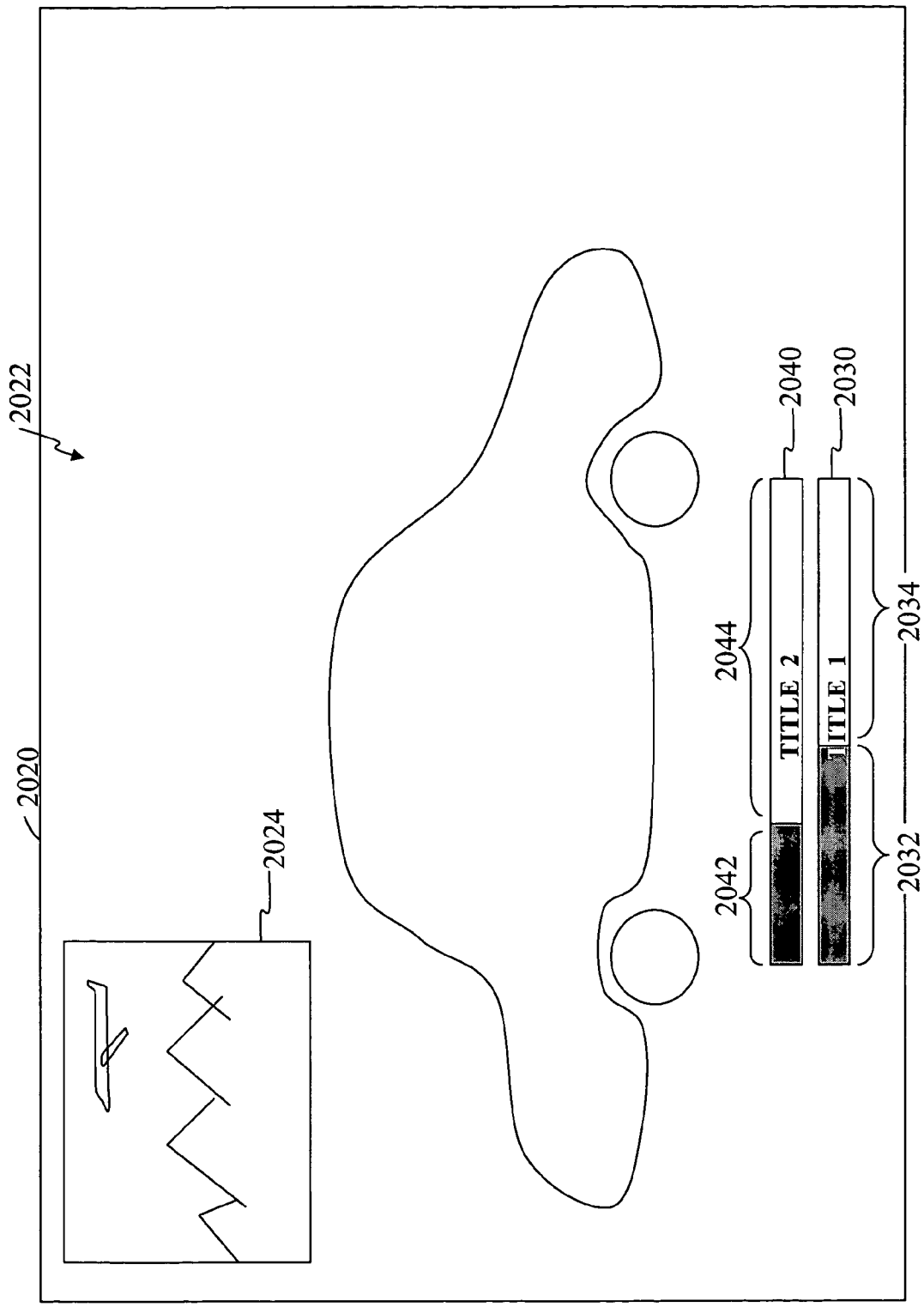
FIG. 20 depicts a simplified diagram of a display currently displaying a main program in a main window of the display while also displaying a secondary program such as a picture-in-picture (PIP)

FIG. 20 depicts a simplified diagram of a display 2020 currently displaying a main program 2022 in a main window of the display while also displaying a secondary program 2024, for example a picture-in-picture (PIP). A progress bar 2030 is also displayed showing the status of the main program 2022. The progress bar shows the amount of the main program already viewed 2032, and the amount of the main program remaining to be viewed 2034. In some implementations, one or more additional progress bars 2040 is/are further displayed showing a lapsed time 2042 and a remaining time 2044 for one or more secondary programs 2024.

Some embodiments of the system include one or more personal video recorder (PVR) and/or digital video recorder (DVR) applications 236, 237 that allow the recording and playback of received programming content. Generally, PVRs are consumer electronics devices and/or are incorporated into consumer electronic devices (e.g., STB) that record broadcast programming content to a memory (e.g., hard disk). The recorded content allows users to play back the content at a time convenient for the user, and also allows for trick modes and/or commands such as pausing live TV, instant replay of interesting scenes, skipping advertising, and other trick commands. In some implementations, the system 120 includes PVR/DVR devices 144 coupled with and external to the STB. Alternatively and/or additionally in some implementations, the STB includes one or more PVR/DVR devices 230-231, 234-235. The PVR/DVR applications utilize and/or include one or more tuners 222-223 to simultaneously record multiple programs.

In some embodiments, the STB includes PVR/DVR applications cooperated with multiple timers to allow the recording of multiple programs simultaneously. Further, the PVR/DVR applications are capable of simultaneously playing back currently received programs (live programs) and/or one or more previously recorded programs, while further recording one or more additional programs. The present embodiments provide for the display of one or more progress bars, and/or a multi-level progress bar to be displayed on the main window of the display 2020 and/or in the program guide 710 showing the progress of currently viewed live programs, the progress of one or more playbacks of previously recorded programs, and/or the progress of one or more recordings of programs.

In some implementations, a user initiates the display of the progress bar/bars through the remote and/or manual controls. For example, the remote control can include a progress bar button and/or a button with more than one function with one of those functions being the initiation of displaying one or more progress bars. When multiple progress bars are displayed, they are displayed one above the other in some implementations. In other implementations the bars can be divided horizontally along the screen; displayed proximate the PIPs 2024; and other such placements.

Figure 21:
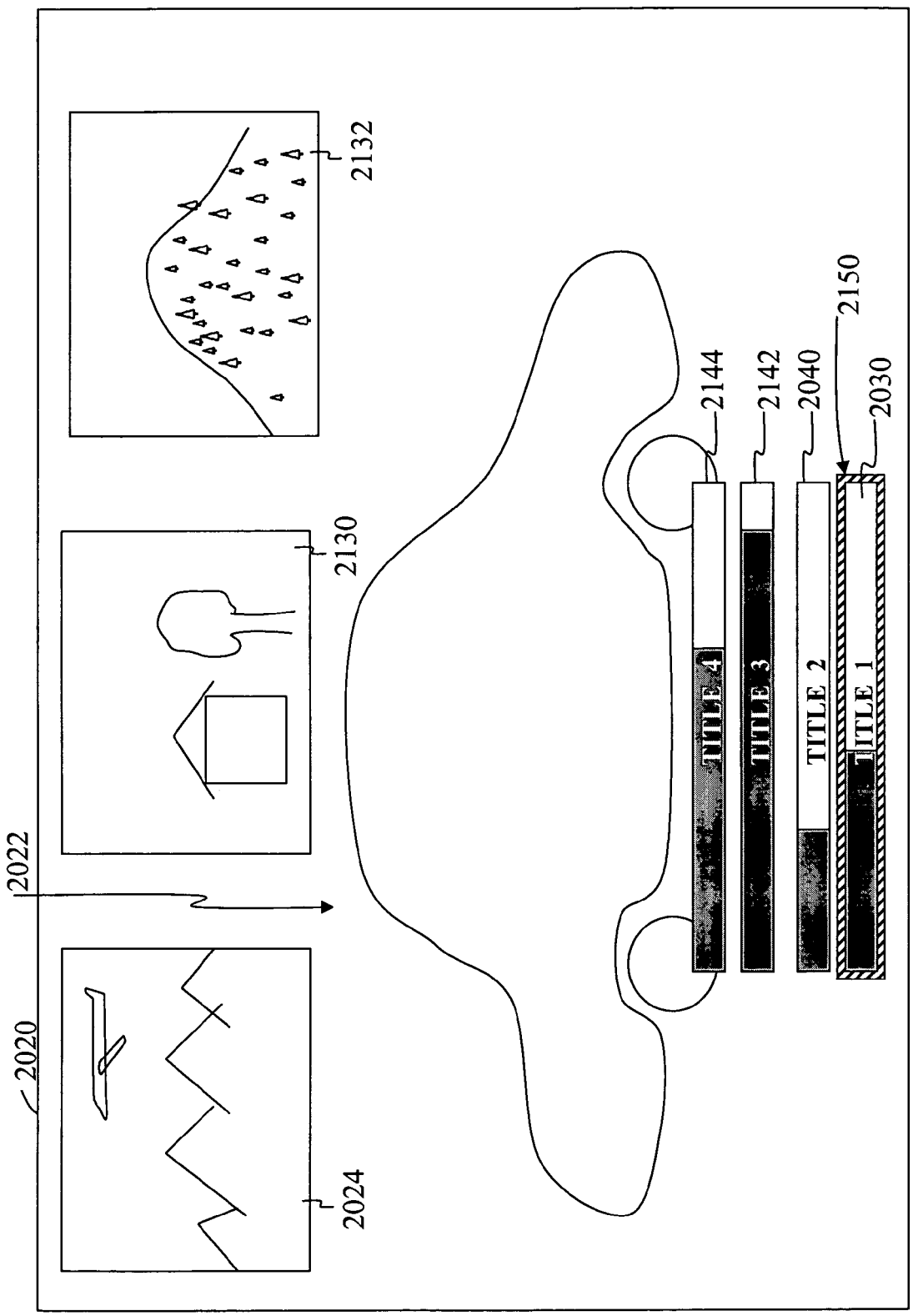
FIG. 21 depicts a simplified diagram of a display currently displaying a main program while also displaying secondary, third and fourth programs 2024, 2130 and 2132, respectively, as picture-in-pictures.

FIG. 21 depicts a simplified diagram of a display 2020 currently displaying a main program 2022 while also displaying secondary, third and fourth programs 2024, 2130 and 2132, respectively, as picture-in-pictures. Also shown in FIG. 21 are a plurality of progress bars 2030, 2040, 2142 and 2144, indicating the playback status of each of the main, secondary, third and fourth programs, respectively. In some embodiments, the selection of a progress bar button initiates the display of the progress bar 2030 associated with the main program 2022. A second selection of the progress bar button or a selection of an expand button (e.g., a specific expand button; the up arrow key when the first progress bar is displayed; or other such button selections) causes the display of one or more additional progress bars 2040, 2142, 2144, when one or more additional playback (and/or record) applications are currently active at the time the expand button is selected. A further selection of the progress bar button and/or expand button, in some implementations, causes additional progress bars to be displayed relating to record functions, if additional record functions are in operation when the expand button is selected.

Figure 22:
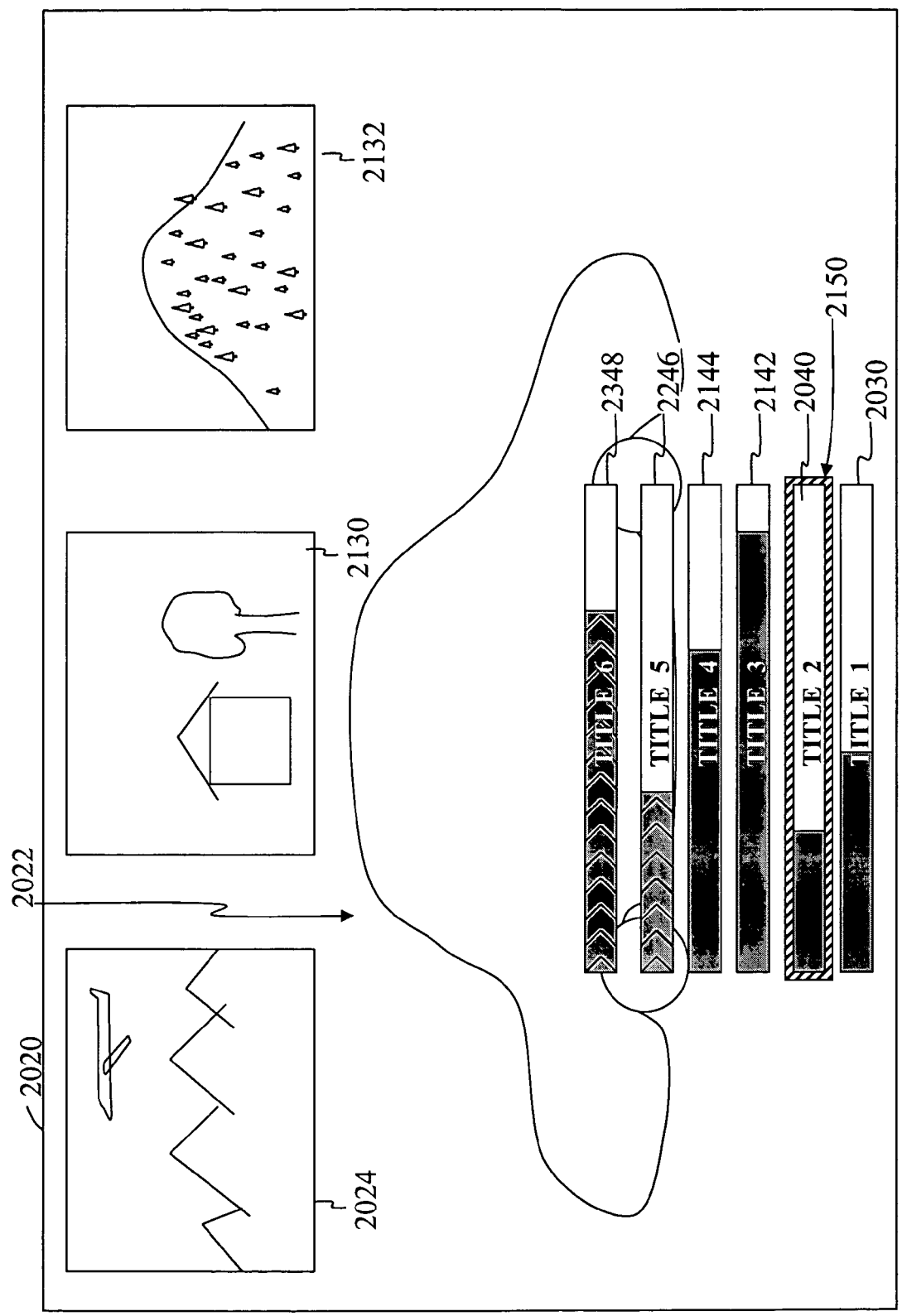
FIG. 22 depicts a simplified diagram of a display currently displaying a main, secondary, third and fourth programs, respectively.

FIG. 22 depicts a simplified diagram of a display 2020 currently displaying a main, secondary, third and fourth programs 2022, 2024, 2130 and 2132, respectively. Also displayed are the main, secondary, third and fourth progress bars 2030, 2040, 2142 and 2144, respectively, along with first and second record progress bars 2246 and 2248 showing the progress of two active record applications.

The display of the progress bars can be achieved in substantially any order and/or configuration. For example, just the record progress bars can be displayed, just the playback status bars can be displayed, just the main playback progress bar can be display, or other such configurations and/or combinations. In some implementations, each selection of the expand button causes a progress bar to be replace by a subsequent progress bar when multiple applications (multiple playback and/or record applications) are in progress. For example, with three playbacks and two records active, the selection of the progress bar five successive times results in just the fifth progress bar being displayed.

In some implementations, the titles of the programs being playback and/or the recorded (e.g., "TITLE 1", "TITLE 2", "TITLE 3", etc.) are displayed within and/or adjacent to the progress bars to identify which progress bar is associate with which playback and/or record. To further aid in distinguishing between playback progress bars and record only progress bars, the record progress bars can be depicted in a first color, while playback only and/or playback/record progress bars are depicted in a second color. In some embodiments, the bars associated with playbacks are each depicted in a different color with a frame around the main program and/or the PIP windows with corresponding colors. Other similar distinctions can be employed to further distinguish between progress bars.

Many PVR/DVR devices incorporate the use of trick commands, such as pause, replay/rewind, fast-forward, and other such trick commands. In some present embodiments, trick commands are utilized to control one or more active playback and/or record applications. Typically, trick commands only apply to playback. In some implementations, however, the recording can be paused, rewound (rewind back over a commercial during other commercials before a program resumes), and other such functions, and thus trick commands are utilized to control record applications in some implementations.

Because the present embodiment allows multiple simultaneous playback and/or record applications, some embodiments allow users to specify one or more of the currently active applications for which selected trick commands are to apply. In some embodiments, when multiple progress bars are displayed, the present embodiment initially identifies and/or distinguishes one of the progress bars as being a controlling or focused application. For example, a progress bar is marked, highlighted 2150 (see FIGS. 21 and 22) or other wise indicated (e.g., arrow pointing to a progress bar) as being the focus progress bar. When the system detects the selection of one or more trick commands, the system applies those trick commands to a focus application currently identified by the marked progress bar. For example, while the main program progress bar 2030 is highlighted 2150, trick commands received are applied to the main program 2022. The user can switch the focus to other playback (and/or record) applications by shifting the focus/highlighting 2150 to other progress bars, for example, by using up and/or down arrow keys to shift the focus between progress bars.

In some implementations, when multiple progress bars are initially displayed, the main program progress bar 2030 by default is highlighted as the focus application. The user simply shifts the highlighting to another progress bar to shift the focus to an alternate playback or record application. In some embodiments, the user can simultaneously select multiple progress bars (e.g., pressing a select button on the remote control to select a progress bar, using up arrow key to shift to a second progress bar and again pressing the select button to highlight a second progress bar, etc.). With multiple progress bars selected, trick commands received are applied to each of the applications selected.

Allowing the selection of one or more playback and/or record applications allows the user to control each of the applications. For example, with one or more PIP playback applications, a user can pause the playback while directing his/her attention to the main program during a critical period, and then resume the PIP playback following the critical period.

In some embodiments, the one or more progress bars are displayed for a predefined period of time. When this predefined period expires, the progress bars are automatically removed from the display. The time out period is reset, in some implementations, each time the user implements some command associated with one or more of the progress bars, for example, switching the focus between two progress bars causes a reset of the time period. Additionally and/or alternatively, the system in some embodiments allows the user to remove one or more progress bars from the display. For example, the user can select a condense or undisplay button on the remote control 150. Alternatively, the user can continue to select the progress bar button which causes progress bars to be removed from the display once of the progress bars for each currently active application has been displayed.

In some embodiments, the first time a progress bar is to be displayed, the progress bar associated with the main program in the main window is displayed. While the first progress bar is being displayed, and an expand button is activated it is determined whether other playback applications are in progress (e.g., PIP applications). If another playback is in progress, the progress bars associated with each active playback is displayed (e.g., displayed above the main progress bar 2030). In some implementations, a focus or highlight rectangle 2150 is further displayed around the main progress bar indicating that received trick commands are apply to the playback of the main window. If it is determined following the detection of the expand command that there are no other currently active playback applications, the system determines whether there are any active records applications. If one or more record applications are in progress, the progress bars associated with the record applications are displayed. In some embodiments, record applications cannot receive trick commands, and because the main playback application is the only active application capable of receiving trick commands, the focus or highlight rectangle is not displayed around the progress bar 2030 of the main program. In some preferred embodiments, if the focus changes between first and second progress bars in the middle of a trick command operation on the first associated application, the trick command for that application continues, while subsequent trick command(s) are applied to the second application, thus allowing multiple trick mode operations per session.

In some implementations, the reception of a second expand command while multiple playback applications are active and multiple playback progress bars are displayed (including main progress bar), causes the system to determine whether any records applications are active. If there are active record applications, record progress bars are additionally displayed (e.g., above the playback progress bars). If there are no active record applications when the second expand command is received, then no new progress bar are displayed. In some embodiments, future detections of expand commands have no effect. Alternatively, some embodiments remove one or more progress bars for each additional detection of expand commands (e.g., remove record application progress bars on a first additional expand command, remove additional playback progress bars upon a second additional expand command, and remove main progress bar upon a third additional expand command). Additionally and/or alternatively, a compress button is defined on the remote in some implementations that initiates the removal of progress bars. For example, compress commands cause the removal of record application progress bars, followed by the additional playback progress bars. When all of the progress bars except for the main progress bar are removed, the focus rectangle is also removed and trick commands are applied to the main progress bar.

As introduced above, some embodiments employ a timeout period, and the period of time associated with each level of displayed progress bars can vary. For example, when only main progress bar is displayed, the timeout period for erasing the progress bar is relatively short. When multiple progress bars are displayed the timeout period is extended so that a user does not have to redisplay the list of progress bars multiple times because the timeout expired.

Figure 23A:
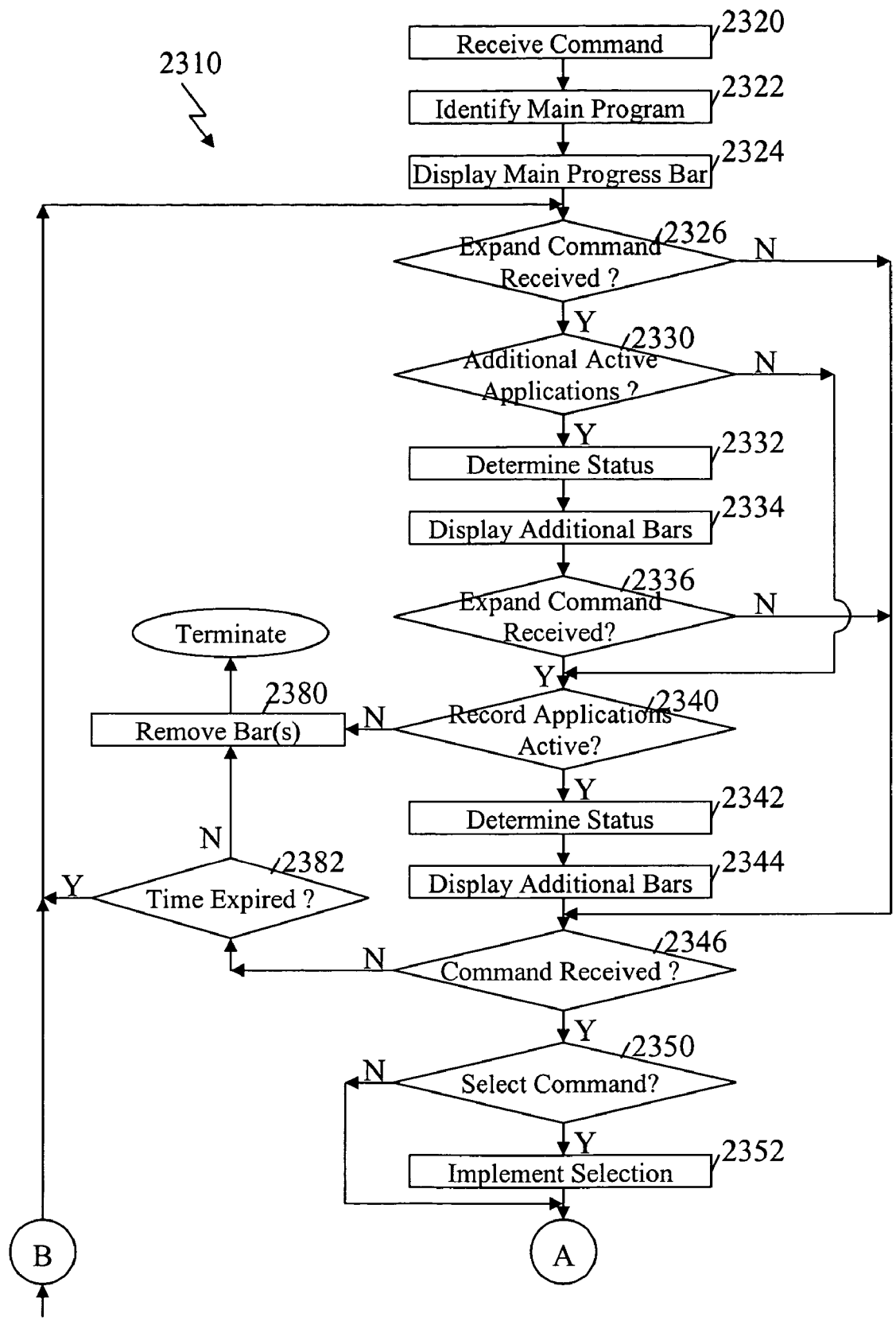
FIGS. 23A-B depict a flow diagram of a process for displaying one or more progress bars in the main widow of the display and/or within an electronic programming guide according to some embodiment.
Figure 23B:
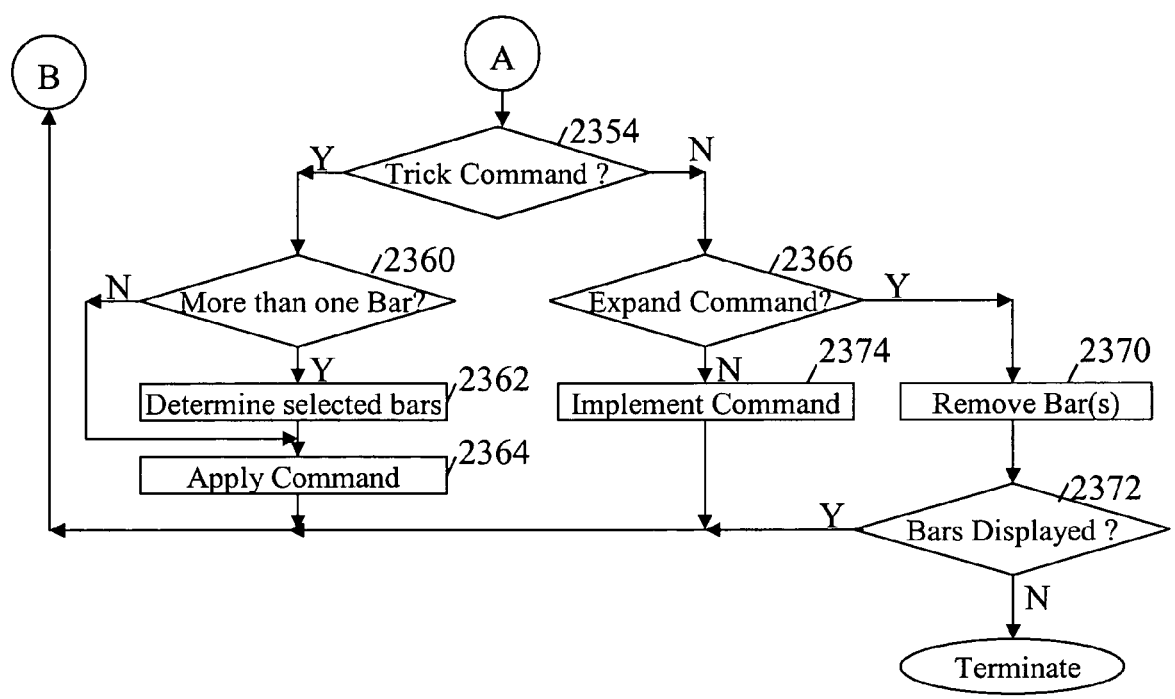

FIGS. 23A-B depict a flow diagram of a process 2310 for displaying one or more progress bars in the main widow of the display 2020 and/or within an electronic programming guide according to some embodiment. In step 2320, the process receives a command to display one or more progress bars (e.g., detects the selection of a progress bar button at the remote control). In step 2322, the main program 2022 is identified and the status of the playback of the main program is determined. In step 2324, a first progress bar (e.g., progress bar 2030) is displayed for the first main program.

In step 2326, the process determines whether an expand command is received. If the expand command is received, the process enters step 2330 where it determines whether there are any additional playback applications currently active. If there are no additional playback applications active, the process continues to step 2340

If there are additional active playback applications, step 2332 is entered where the status of each additional playback application is determined. In step 2334, one additional progress bar is displayed for each identified active playback application. The process then continues to step 2336 where it is determined whether an expand command is again received. If the expand command is received, the process continues to step 2340, otherwise the process continues to step 2346.

In step 2340 it is determined whether there are record applications that are currently active. If there are active record applications, the process enters step 2342 where the status of each active record application is determined. In step 2344, progress bars are generated for each active record application. If there are not active record applications the process proceeds to step 2380 where one or more progress bars (e.g., main progress bar) are removed from the display and the process terminates.

If the expand command is not received in step 2326, the process continues to step 2346 where the process determines whether a command has been received. If a command has not been received, the process continues to step 2382 where it determines whether a time limit has expired. If not the process returns to step 2326, otherwise the process enters step 2380 where one or more progress bars are removed from the display and the process terminates.

If it is determined in step 2346 that commands are received, step 2350 is entered where it is further determined whether the command is a selection command to initiate the selection and/or highlighting of one or more of the progress bars and thus focusing trick commands on associated playback and/or record applications. If a selection is received, the selection is implemented in step 2352. Following step 2352 and if the received command is not a selection command, step 2354 is entered where it is determined if the command received was a trick command. If the received command is a trick command, step 2360 is entered where it is determined if one or more progress bars are displayed. If there is more than one bar displayed, step 2362 is entered where the process determines which of the plurality of bars are focused and/or selected. Following step 2362 and if there is only one bar selected in step 2360, step 2364 applies the requested trick commands to each playback and/or record application selected and/or highlighted. The process then returns to step 2326 to determine if additional commands are received.

If it is determined in step 2354 that the received command is not a trick command, the process enters step 2366 where it is determined whether the command is an additional expand command and/or an undisplay command. If the command is an additional expand command and/or an undisplay command, one or more progress bars are removed from the display at step 2370. In step 2372, it is determined whether additional progress bars are still displayed. If no other bars are displayed the process 2310 terminates, alternatively, step 2374 implements the alternate command. The process then returns to step 2326 to await additional commands.

While the invention herein disclosed has been described by means of specific embodiments and applications thereof, numerous modifications and variations could be made thereto by those skilled in the art without departing from the scope of the invention set forth in the claims.

What is claimed is:

1. Method for use in displaying an electronic programming guide, comprising:
   receiving programming guide data;
   identifying a currently logged in user of a plurality of registered users;
   determining whether the programming guide data is to be filtered;
   filtering the programming guide data when it is determined that the programming guide data is to be filtered, relative to the currently logged in user, comprising replacing at least a first title with a first generic title and removing a blocked channel from the programming guide;
   determining whether limits are to be applied to the programming guide data, comprising determining whether one or more limits specific to the logged in user are to be applied, and determining whether one or more global limits are defined, where the one or more the global limits are specified to be applied to each of the plurality of registered user;
   applying the limits to the programming guide data when it is determined that the limits are to be applied to the programming guide data, relative to the currently logged in user, comprising replacing at least a second title with a second generic title; and
   displaying a programming guide according to programming guide data as filtered and as limited such that the programming guide lists at least the first generic title in place of the first title, lists the second generic title in place of the second title, where the removed blocked channel is not displayed in the programming guide and no reference to the removed blocked channel is displayed in the programming guide, and where the programming guide lists the logged in user;
   identifying that a plurality of applications are currently active, wherein the displaying the programming guide comprises displaying a plurality of progress bar with each progress bar corresponding to a different one of the plurality of active applications;
   simultaneously marking at least two of the plurality of progress bars associated with at least two active applications where each of the two applications are capable of implementing a trick command;
   receiving a trick command; and
   substantially simultaneously implementing, in response to receiving the trick command, the trick command through each of the at least two active application corresponding to the at least two marked progress bars.

2. The method of claim 1, wherein the determining whether limits are to be applied further comprises accessing a first user profile of a plurality of user profiles having limits defined, where the first user profile corresponds with the logged in user, and identifying one or more limits are defined by the logged-in user are specified in addition to limits specified by an administrator, and the applying the limits further comprises applying the one or more limits defined by the logged-in user and the limits specified by the administrator to the programming guide data when the first user profile comprises the one or more limits defined by the logged-in user are specified in addition to limits specified by an administrator and preventing access to programming content associated with the first title replaced with the first generic title.

3. The method of claim 1, wherein the filtering of the programming guide comprises applying word filtering and applying a natural language filtering to the programming guide data, where the natural language filtering overrides the word filtering such that the natural language filtering does not filter the programming guide data relative to a third title in the programming guide data when the third title would have otherwise been filtered due to the word filtering.

4. The method of claim 3, wherein the filtering of the programming guide comprises searching through the programming guide data and identifying a fourth entry in the programming guide data containing one or more words to be filtered, and removing the one or more words from the fourth entry while maintaining one or more other words; and
   the displaying the programming guide comprises displaying the fourth entry with the one or more words removed.

5. The method of claim 1, further comprising:
   determining a number of currently active applications; and
   displaying the programming guide comprises displaying, within the electronic programming guide, a progress bar for at least one of the active application where the progress bar depicts a status of a program being accessed relative to the electronic programming guide comprising a time elapsed of the program and a time remaining.

6. The method of claim 1, further comprising:
   accessing the logged-in user's profile;
   the determining whether the programming guide data is to be filtered comprises determining whether filtering categories are defined in the logged-in user's profile, and the applying the filtering further comprises applying the defined filtering categories to the programming guide data when the logged-in user's profile includes defined filtering categories.

7. The method of claim 1, further comprising:
   registering a new user comprising:
      copying a user profile of one of the plurality of registered users;
      associating the copied user profile with the new user to establish a new user profile;
      allowing the new user profile to be altered relative to the new user, comprising altering one of the filtering and the limits; and
      recording the altered new user profile.

8. The method of claim 1, further comprising:
   receiving a further limit;
   receiving a designation identifying more than one of the plurality of registered users to which the limit is to be applied; and
   incorporating the further limit into user profiles associated with each of the identified more than one of the plurality of registered users.

9. The method of claim 1, further comprising:
   searching, automatically without user interaction, the programming data;
   detecting, through the searching, and without user interaction, one or more additional parameters specified in the programming data that previously were not included in previously received programming data; and
   expanding, without user interaction, parameters available to one or more users to be applied as limits to include the detected one or more additional parameters.

10. A method for use in controlling displayed information relative to the playback of programming content, comprising:
receiving programming content;
initiating a main application to play back a main program from at least a portion of the programming content;
displaying a main progress bar associated with the main application that is active;
determining whether one or more first additional applications are active in addition to the main application;
displaying a first additional progress bar for each of the first additional applications that are active;
determining whether at least two of the active applications are capable of implementing a first trick command, wherein the active applications comprise the main application and the first additional application;
marking at least one progress bar associated with the at least two active applications capable of implementing the first trick command so as to provide at least one first-marked progress bar;
receiving a selection of two or more of the progress bars corresponding to the at least two of the active applications capable of implementing the first trick command such that the two or more progress bars are simultaneously selected;
substantially simultaneously executing the first trick command, in response to receiving the first trick command, through each of the two or more active applications corresponding to the selected two or more progress bars;
unmarking at least one of the first-marked progress bars providing at least one first unmarked progress bar;
preventing execution of a second trick command through the active application associated with the at least one first unmarked progress bar;
marking a different progress bar associated with the at least two active applications capable of implementing the first trick command so as to provide at least one second-marked progress bar;
enabling reception of the second trick command for the active application associated with the at least one second-marked progress bar; and
executing the second trick command through the active application associated with the at least one second-marked progress bar.

11. The method of claim 10, further comprising:
determining whether one or more second additional applications are active in addition to the main application and the first additional applications; and
displaying a second additional progress bar for each of the one or more second additional applications that are active.

12. The method of claim 11, further comprising:
distinguishing each second additional progress bar from each first additional progress bar and from the main progress bar, where each second additional progress bar is the same size as each first additional progress bar and the same size as the main progress bar.

13. The method of claim 11, wherein the first additional applications comprises playback applications that play back first additional programs from the programming content and the second additional applications comprises record applications that record second additional programs from the programming content.

14. The method of claim 13, further comprising:
generating a programming guide;
displaying the programming guide;
incorporating the main progress bar, the first additional progress bar, and the second additional progress bar, wherein the displaying the main progress bar, the first additional progress bar and the second additional progress bar comprises displaying the programming guide such the main progress bar, the first additional progress bar, and second additional progress bar are displayed with the programming guide;
wherein the displayed programming guide displays at any given time:
a plurality of channels;
a plurality of selectable television programs, such that each channel is associated with at least one of the plurality of selectable television programs; and
a plurality of times defining when each of the plurality of selectable television programs are to be broadcast.

15. The method of claim 14, further comprising:
receiving programming guide data;
applying filtering to the programming guide data;
replacing at least one title of the programming guide data with a generic title according to the filtering, such that the displaying the programming guide further comprises displaying the programming guide with the generic title and the at least one title is prevented from being displayed.

16. The method of claim 10, further comprising:
undisplaying the first additional progress bar for each of the active first additional application; and
unmarking the at least one progress bar in response to the undisplaying of the first additional progress bar for each of the active first additional applications.

17. The method of claim 10, wherein the marking comprises:
implementing the marking in response to determining that at least two of the active applications are capable of implementing the first trick command; and
wherein the marking designates the progress bar associated with the application to implement the first trick command in the event the command is issued.

18. The method of claim 10, wherein the receiving the selection of the two or more progress bars comprises receiving the selection of two or more progress bars each corresponding to one of the at least two of the applications capable of implementing the first trick command when the first trick command is a pause command; and
the substantially simultaneously implementing the first trick command comprises substantially simultaneously pausing each of the two or more active applications corresponding to the selected two or more progress bars while continuing playback of programming through a separate application corresponding to a progress bar that was not selected when the first trick command was received.

19. An apparatus for use in controlling display information, comprising:
an input port for receiving programming content and programming guide data;
means for natural language filtering that filters the programming guide data;
means for generating a programming guide using the programming guide data as filtered by the means for natural language filtering;
means for playing back programming content;
means for recording programming content;
means for monitoring the progress of the means for playing back programming content and the means for recording programming content; and
means for generating a plurality of progress bars according to the means for monitoring the progress, such that the means for generating the plurality of progress bars comprises means for substantially simultaneously maintaining the plurality of progress bars when both the means for playing back programming content and the means for recording programming content are implemented simultaneously, where the plurality of progress bars represent, upon being displayed, a relative portion of the programming content being accessed relative to a duration of the programming content;

means for determining whether at least two active applications are capable of implementing a first trick command, wherein the at least two active applications comprise the means for playing back programming content and the means for recording programming content;

means for marking two or more progress bars, wherein each of the two or more progress bars are associated with one of the at least two active applications capable of implementing the first trick command so as to provide two or more first-marked progress bars;

means for substantially simultaneously executing, in response to receiving the first trick command while the two or more progress bars are marked, the first trick command through each of the at least two active applications each associated with one of the two or more first-marked progress bars;

means for unmarking at least one of the two or more first-marked progress bars providing at least one first unmarked progress bar;

means for preventing execution of a second trick command through the active application associated with the at least one first unmarked progress bar;

means for marking a different progress bar associated with the at least two active applications capable of implementing the first trick command so as to provide at least one second-marked progress bar;

means for enabling reception of the second trick command for the active application associated with the at least one second-marked progress bar; and means for executing the second trick command through the active application associated with the at least one second-marked progress bar.

20. The apparatus of claim 19, further comprising:

means for generating a plurality of user profiles where the means for generating the plurality of user profiles incorporates filtering parameters into at least two of the plurality of user profiles, wherein the means for natural language filtering applies parameters as defined through the means for generating the plurality of user profiles.

* * * * *

UNITED STATES PATENT AND TRADEMARK OFFICE
CERTIFICATE OF CORRECTION

PATENT NO. : 7,774,811 B2
APPLICATION NO. : 10/928552
DATED : August 10, 2010
INVENTOR(S) : Poslinski et al.

Page 1 of 1

It is certified that error appears in the above-identified patent and that said Letters Patent is hereby corrected as shown below:

Claim 2, column 21, line 64, delete "one" and insert --if one--.

Signed and Sealed this

Thirtieth Day of November, 2010

David J. Kappos
*Director of the United States Patent and Trademark Office*